United States Patent
Bae et al.

(10) Patent No.: US 12,495,418 B2
(45) Date of Patent: Dec. 9, 2025

(54) METHOD FOR PERFORMING UPLINK TRANSMISSION, USER EQUIPMENT, PROCESSING DEVICE, STORAGE MEDIUM, COMPUTER PROGRAM, AND METHOD AND BASE STATION FOR RECEIVING UPLINK TRANSMISSION

(71) Applicant: LG ELECTRONICS INC., Seoul (KR)

(72) Inventors: Duckhyun Bae, Seoul (KR); Seokmin Shin, Seoul (KR); Suckchel Yang, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 286 days.

(21) Appl. No.: 18/272,297

(22) PCT Filed: Jan. 17, 2022

(86) PCT No.: PCT/KR2022/000810
§ 371 (c)(1),
(2) Date: Jul. 13, 2023

(87) PCT Pub. No.: WO2022/154612
PCT Pub. Date: Jul. 21, 2022

(65) Prior Publication Data
US 2024/0089956 A1    Mar. 14, 2024

(30) Foreign Application Priority Data
Jan. 15, 2021   (KR) .................. 10-2021-0006354

(51) Int. Cl.
*H04W 72/1268*    (2023.01)
*H04W 16/14*    (2009.01)
*H04W 72/50*    (2023.01)

(52) U.S. Cl.
CPC ....... *H04W 72/1268* (2013.01); *H04W 16/14* (2013.01); *H04W 72/50* (2023.01)

(58) Field of Classification Search
CPC ............. H04W 72/23; H04W 74/0833; H04W 72/1268; H04W 72/21; H04W 74/006;
(Continued)

(56) References Cited

U.S. PATENT DOCUMENTS 10,986,695 B1 *   4/2021   Babaei ................. H04W 76/36
11,419,123 B2 *   8/2022   Fakoorian ......... H04W 72/0453
(Continued)

FOREIGN PATENT DOCUMENTS

KR   1020200131890   11/2020
KR   1020200138382   12/2020
(Continued)

OTHER PUBLICATIONS

PCT International Application No. PCT/KR2022/000810, International Search Report dated Apr. 27, 2022, 2 pages.
(Continued)

*Primary Examiner* — Olumide Ajibade Akonai
(74) *Attorney, Agent, or Firm* — LEE, HONG, DEGERMAN, KANG & WAIMEY

(57) ABSTRACT

A UE performs operations for: receiving a configuration for a reference resource region for an uplink cancellation indication; receiving scheduling information for scheduling uplink transmission on a frequency band including the reference resource region; receiving uplink cancellation indication information related to the reference resource region; and determining whether to cancel the uplink transmission on the basis of whether a first resource for the uplink transmission overlaps with a second resource, indicated by the uplink cancellation indication information, among resources in the reference resource region. The reference
(Continued)

resource region may include one or more RB sets, each including a plurality of interlaced RBs. The uplink cancellation indication information may include a first information part pertaining to at least one of the plurality of interlaced RBs in the one or more RB sets.

12 Claims, 11 Drawing Sheets

(58) Field of Classification Search
CPC ............... H04W 16/14; H04W 74/002; H04W 74/0836; H04W 72/20; H04W 72/0446; H04W 72/232; H04W 28/02; H04W 72/02; H04W 72/1273; H04W 72/54; H04W 72/0453; H04W 72/569; H04W 74/0808; H04W 24/04; H04W 28/12
See application file for complete search history.

(56) References Cited

U.S. PATENT DOCUMENTS

| | | | | |
|---|---|---|---|---|
| 11,516,778 | B2* | 11/2022 | Mukherjee | .......... H04W 74/085 |
| 2020/0229202 | A1* | 7/2020 | Bagheri | .............. H04L 25/0226 |
| 2020/0359447 | A1* | 11/2020 | Yang | ..................... H04W 24/08 |
| 2020/0389876 | A1 | 12/2020 | Islam et al. | |
| 2021/0204358 | A1* | 7/2021 | Babaei | ................... H04W 72/23 |
| 2023/0171779 | A1* | 6/2023 | Xu | ........................ H04L 5/0096 370/329 |

FOREIGN PATENT DOCUMENTS

| | | |
|---|---|---|
| WO | 2020033660 | 2/2020 |
| WO | 2020223448 | 11/2020 |
| WO | 2022061648 | 3/2022 |

OTHER PUBLICATIONS

Qualcomm Incorporated, "Discussion on NR Rel-16 UE features," 3GPP TSG RAN WG1 #103-e, R1-2008631, Nov. 2020, 82 pages.
Wilus Inc., "Remaining issues on UL cancellation scheme for NR URLLC," 3GPP TSG RAN WG1 #100, R1-2000938, Mar. 2020, 13 pages.
European Patent Office Application Serial No. 22739804.7, Search Report dated Nov. 14, 2024, 10 pages.
Korean Intellectual Property Office Application No. 10-2023-7022669, Office Action dated Jul. 10, 2025, 5 pages.
Ericsson, "Feature lead summary for UL Signals and Channels", R1-1913521, 3GPP TSG-RAN WG1 Meeting #98b, Aug. 2019, 38 pages.

* cited by examiner

FIG. 8
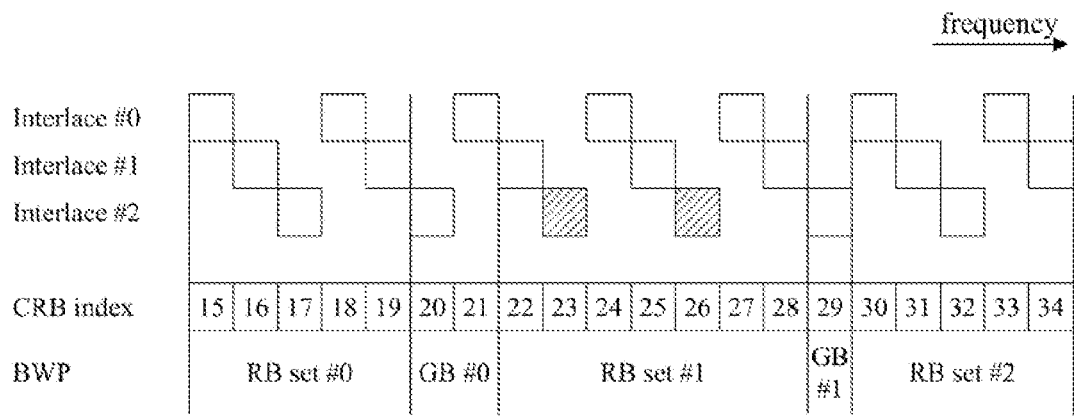
RB assignment information for PUSCH: {Interlace #2, RB set #1} => Intersection of Interla ce #1 and RB set #1
(a) Case 1: one RB set index is indicated via RA information for PUSCH
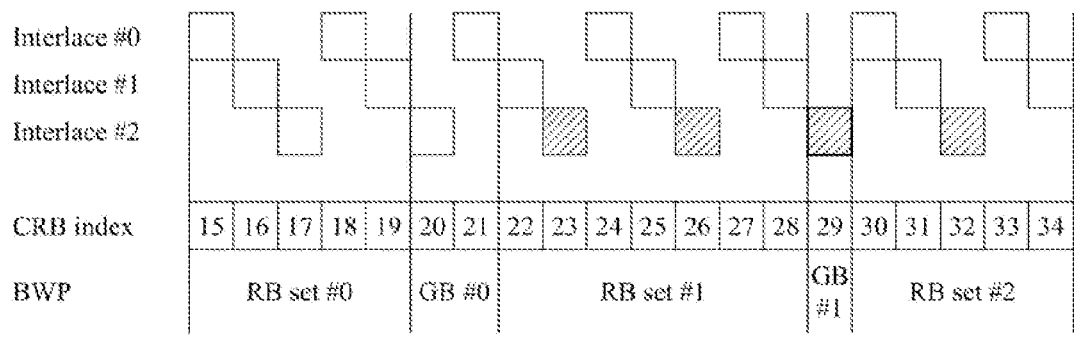
RB assignment information for PUSCH: {Interlace #2, RB sets #1 and #2} => Intersection of Interlace #1 and RB set #1/RB set #2/GB#1
(b) Case 2: consecutive RB set indexes are indicated via RA information for PUSCH

METHOD FOR PERFORMING UPLINK TRANSMISSION, USER EQUIPMENT, PROCESSING DEVICE, STORAGE MEDIUM, COMPUTER PROGRAM, AND METHOD AND BASE STATION FOR RECEIVING UPLINK TRANSMISSION

CROSS-REFERENCE TO RELATED APPLICATIONS

This application is the National Stage filing under 35 U.S.C. 371 of International Application No. PCT/KR2022/000810, filed on Jan. 17, 2022, which claims the benefit of earlier filing date and right of priority to Korean Application No. 10-2021-0006354, filed on Jan. 15, 2021, the contents of which are all incorporated by reference herein in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

In addition, an efficient method for canceling previously scheduled transmission is required for cases where other transmission is prioritized over the previously scheduled transmission.

The objects to be achieved with the present disclosure are not limited to what has been particularly described hereinabove and other objects not described herein will be more clearly understood by persons skilled in the art from the following detailed description.

In an aspect of the present disclosure, there is provided a method of performing uplink transmission by a user equipment (UE) in a wireless communication system. The method may include: receiving a configuration for a reference resource region for an uplink cancellation indication; receiving scheduling information for scheduling the uplink transmission on a frequency band including the reference resource region; receiving uplink cancellation indication information related to the reference resource region; and based on whether a first resource for the uplink transmission overlaps with a second resource indicated by the uplink cancellation indication information among resources in the reference resource region, determining whether to cancel the uplink transmission. The reference resource region may include one or more resource block (RB) sets, each of which includes a plurality of interlaced RBs, and the uplink cancellation indication information may include a first information part on at least one of the plurality of interlaced RBs in each of the one or more RB sets.

In another aspect of the present disclosure, there is provided a UE configured to perform uplink transmission in a wireless communication system. The UE may include: at least one transceiver; at least one processor; and at least one computer memory operably connected to the at least one processor and configured to store instructions that, when executed, cause the at least one processor to perform operations. The operations may include: receiving a configuration for a reference resource region for an uplink cancellation indication; receiving scheduling information for scheduling the uplink transmission on a frequency band including the reference resource region; receiving uplink cancellation indication information related to the reference resource region; and based on whether a first resource for the uplink transmission overlaps with a second resource indicated by the uplink cancellation indication information among resources in the reference resource region, determining whether to cancel the uplink transmission. The reference resource region may include one or more RB sets, each of which includes a plurality of interlaced RBs, and the uplink cancellation indication information may include a first information part on at least one of the plurality of interlaced RBs in each of the one or more RB sets.

In another aspect of the present disclosure, there is provided a processing device in a wireless communication system. The processing device may include: at least one processor; and at least one computer memory operably connected to the at least one processor and configured to store instructions that, when executed, cause the at least one processor to perform operations. The operations may include: receiving a configuration for a reference resource region for an uplink cancellation indication; receiving scheduling information for scheduling uplink transmission on a frequency band including the reference resource region; receiving uplink cancellation indication information related to the reference resource region; and based on whether a first resource for the uplink transmission overlaps with a second resource indicated by the uplink cancellation indication information among resources in the reference resource region, determining whether to cancel the uplink transmission. The reference resource region may include one or more RB sets, each of which includes a plurality of interlaced RBs, and the uplink cancellation indication information may include a first information part on at least one of the plurality of interlaced RBs in each of the one or more RB sets.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: receiving a configuration for a reference resource region for an uplink cancellation indication; receiving scheduling information for scheduling uplink transmission on a frequency band including the reference resource region; receiving uplink cancellation indication information related to the reference resource region; and based on whether a first resource for the uplink transmission overlaps with a second resource indicated by the uplink cancellation indication information among resources in the reference resource region, determining whether to cancel the uplink transmission. The reference resource region may include one or more RB sets, each of which includes a plurality of interlaced RBs, and the uplink cancellation indication information may include a first information part on at least one of the plurality of interlaced RBs in each of the one or more RB sets.

In another aspect of the present disclosure, there is provided a computer program stored in a computer-readable storage medium. The computer program may include at least one program code including instructions that, when executed, cause at least one processor to perform operations. The operations may include: receiving a configuration for a reference resource region for an uplink cancellation indication; receiving scheduling information for scheduling uplink transmission on a frequency band including the reference resource region; receiving uplink cancellation indication information related to the reference resource region; and based on whether a first resource for the uplink transmission overlaps with a second resource indicated by the uplink cancellation indication information among resources in the reference resource region, determining whether to cancel the uplink transmission. The reference resource region may include one or more RB sets, each of which includes a plurality of interlaced RBs, and the uplink cancellation indication information may include a first information part on at least one of the plurality of interlaced RBs in each of the one or more RB sets.

In each aspect of the present disclosure, the operations may include, based on the first resource for the uplink transmission not overlapping with the second resource indicated by the uplink cancellation indication information, performing the uplink transmission.

In each aspect of the present disclosure, the operations may include, based on the first resource for the uplink transmission overlapping with the second resource indicated by the uplink cancellation indication information, performing the uplink transmission.

In each aspect of the present disclosure, the uplink cancellation indication information may include a second information part indicating one of the one or more RB sets.

In each aspect of the present disclosure, the frequency band may be an unlicensed band.

In each aspect of the present disclosure, the operations may include, based on i) the first resource for the uplink transmission overlapping with the second resource indicated by the uplink cancellation indication information and ii) the uplink transmission having a low priority, performing the uplink transmission.

In each aspect of the present disclosure, the operations may include, based on i) the first resource for the uplink transmission overlapping with the second resource indicated by the uplink cancellation indication information and ii) the uplink transmission having a high priority, performing the uplink transmission.

In each aspect of the present disclosure, the operations may include, based on at least one bit of the first information part not being zero, performing the uplink transmission without a listen-before-talk (LBT) process.

In each aspect of the present disclosure, the operations may include: based on all bits of the first information part being zero, performing an LBT process; and based on success of the LBT process, performing the uplink transmission.

In another aspect of the present disclosure, there is provided a method of receiving, by a base station (BS), uplink transmission from a UE in a wireless communication system. The method may include: transmitting a configuration for a reference resource region for an uplink cancellation indication; receiving to the UE scheduling information for scheduling the uplink transmission on a frequency band including the reference resource region; transmitting uplink cancellation indication information related to the reference resource region; and based on whether a first resource for the uplink transmission overlaps with a second resource indicated by the uplink cancellation indication information among resources in the reference resource region, determining whether to receive the uplink transmission. The reference resource region may include one or more RB sets, each of which includes a plurality of interlaced RBs, and the uplink cancellation indication information may include a first information part on at least one of the plurality of interlaced RBs in each of the one or more RB sets.

In a further aspect of the present disclosure, there is provided a BS configured to receive uplink transmission from a UE in a wireless communication system. The BS may include: at least one transceiver; at least one processor; and at least one computer memory operably connected to the at least one processor and configured to store instructions that, when executed, cause the at least one processor to perform operations. The operations may include: transmitting a configuration for a reference resource region for an uplink cancellation indication; receiving to the UE scheduling information for scheduling the uplink transmission on a frequency band including the reference resource region; transmitting uplink cancellation indication information related to the reference resource region; and based on whether a first resource for the uplink transmission overlaps with a second resource indicated by the uplink cancellation indication information among resources in the reference resource region, determining whether to receive the uplink transmission. The reference resource region may include one or more RB sets, each of which includes a plurality of interlaced RBs, and the uplink cancellation indication information may include a first information part on at least one of the plurality of interlaced RBs in each of the one or more RB sets.

In each aspect of the present disclosure, the operations may include, based on the first resource for the uplink transmission not overlapping with the second resource indicated by the uplink cancellation indication information, skipping reception of the uplink transmission.

In each aspect of the present disclosure, the operations may include, based on the first resource for the uplink transmission overlapping with the second resource indicated by the uplink cancellation indication information, performing reception of the uplink transmission.

In each aspect of the present disclosure, the uplink cancellation indication information may include a second information part indicating one of the one or more RB sets.

In each aspect of the present disclosure, the frequency band may be an unlicensed band.

In each aspect of the present disclosure, the operations may include, based on i) the first resource for the uplink transmission overlapping with the second resource indicated by the uplink cancellation indication information and ii) the uplink transmission having a low priority, performing reception of the uplink transmission.

In each aspect of the present disclosure, the operations may include, based on i) the first resource for the uplink transmission overlapping with the second resource indicated by the uplink cancellation indication information and ii) the uplink transmission having a high priority, performing reception of the uplink transmission.

In each aspect of the present disclosure, the operations may include setting at least one bit of the first information part to a non-zero value to indicate that the uplink transmission needs to be performed without an LBT process.

In each aspect of the present disclosure, the operations may include setting all bits of the first information part to zero to indicate that the uplink transmission needs to be performed after an LBT process.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementations of the present disclosure, the burden of physical downlink control channel (PDCCH) monitoring in a user equipment (UE) may be reduced.

According to some implementations of the present disclosure, the signaling overhead of an uplink cancellation indication may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 8 illustrates uplink (UL) resource allocation based on interlaced RBs;

DETAILED DESCRIPTION

Figure 1:
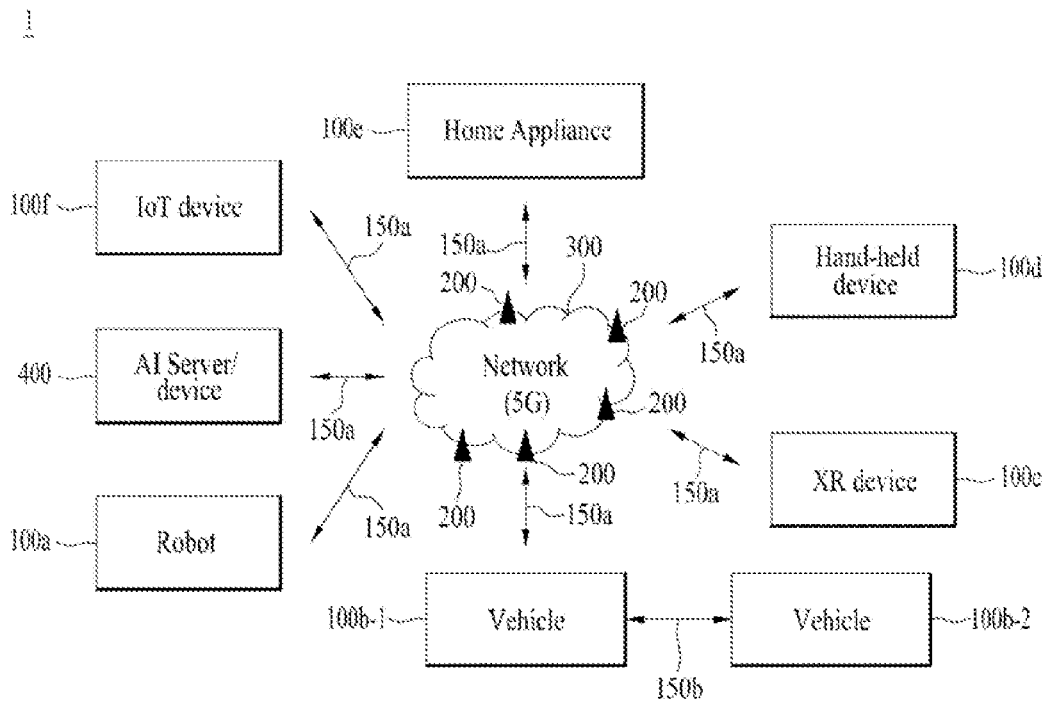
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, Pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (S cells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. PSCell is a primary Scell of an SCG. For a UE in RRC CONNECTED state, not configured with CA or DC, only one serving cell including only the Pcell is present. For a UE in RRC CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements (REs)) that is a set of REs that carry downlink control information (DCI), and the PDSCH refers to a set of time-frequency resources that is a set of REs that carry DL data. The PUCCH, PUSCH, and PRACH refer to a set of time-frequency resources that is a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100$a$, vehicles 100$b$-1 and 100$b$-2, an extended reality (XR) device 100$c$, a hand-held device 100$d$, a home appliance 100$e$, an Internet of Things (IoT) device 100$f$, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100$a$ to 100$f$ may be connected to a network 300 via BSs 200. AI technology may be applied to the wireless devices 100$a$ to 100$f$ and the wireless devices 100$a$ to 100$f$ may be connected to the AI server 400 via the network 300. The network 300 may be configured using a 3G network, a 4G (e.g., LTE) network, or a 5G (e.g., NR) network. Although the wireless devices 100$a$ to 100$f$ may communicate with each other through the BSs 200/network 300, the wireless devices 100$a$ to 100$f$ may perform direct communication (e.g., sidelink communication) with each other without passing through the BSs/network. For example, the vehicles 100$b$-1 and 100$b$-2 may perform direct communication (e.g., vehicle-to-vehicle (V2V)/Vehicle-to-everything (V2X) communication). The IoT device (e.g., a sensor) may perform direct communication with other IoT devices (e.g., sensors) or other wireless devices 100$a$ to 100$f$.

Wireless communication/connections 150$a$ and 150$b$ may be established between the wireless devices 100$a$ to 100$f$ and the BSs 200 and between the wireless devices 100$a$ to 100$f$). Here, the wireless communication/connections such as UL/DL communication 150$a$ and sidelink communication 150$b$ (or, device-to-device (D2D) communication) may be established by various RATs (e.g., 5G NR). The wireless devices and the BSs/wireless devices may transmit/receive radio signals to/from each other through the wireless communication/connections 150$a$ and 150$b$. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
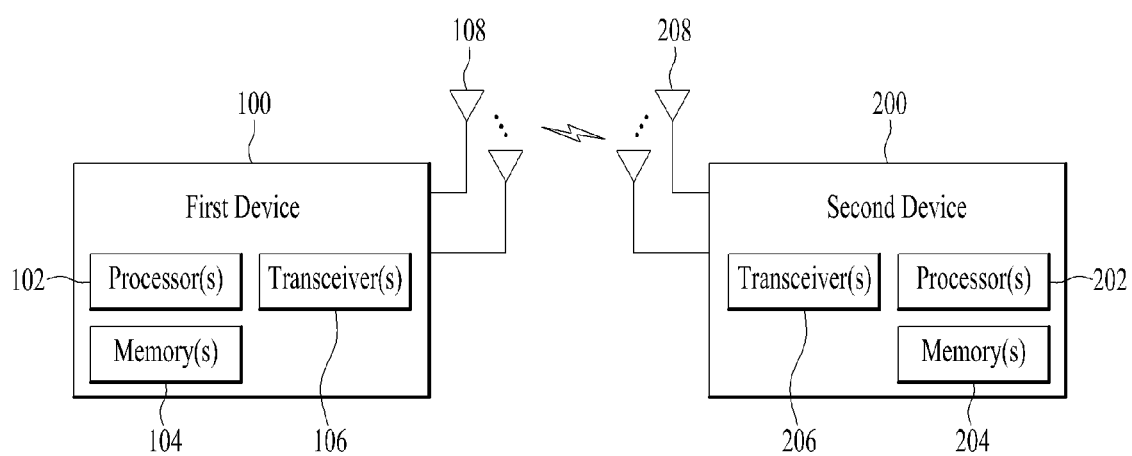
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100$x$ and the BS 200} and/or {the wireless device 100$x$ and the wireless device 100$x$} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
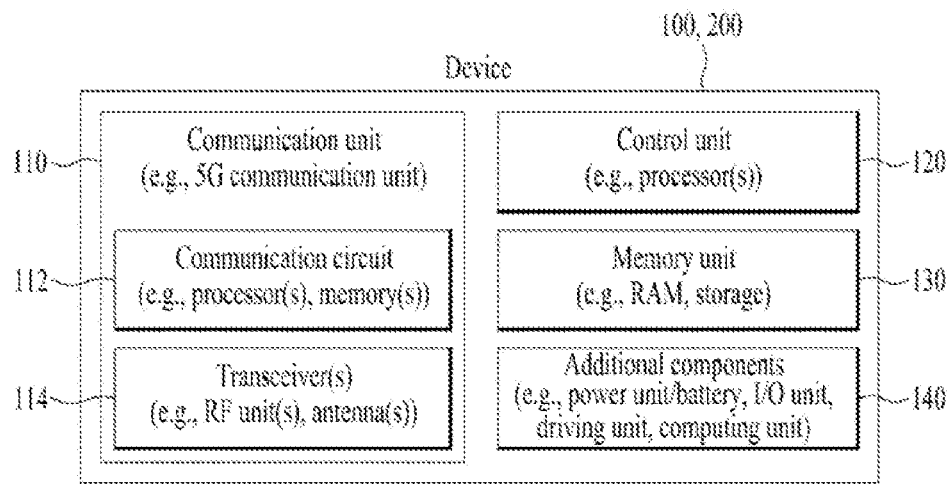
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
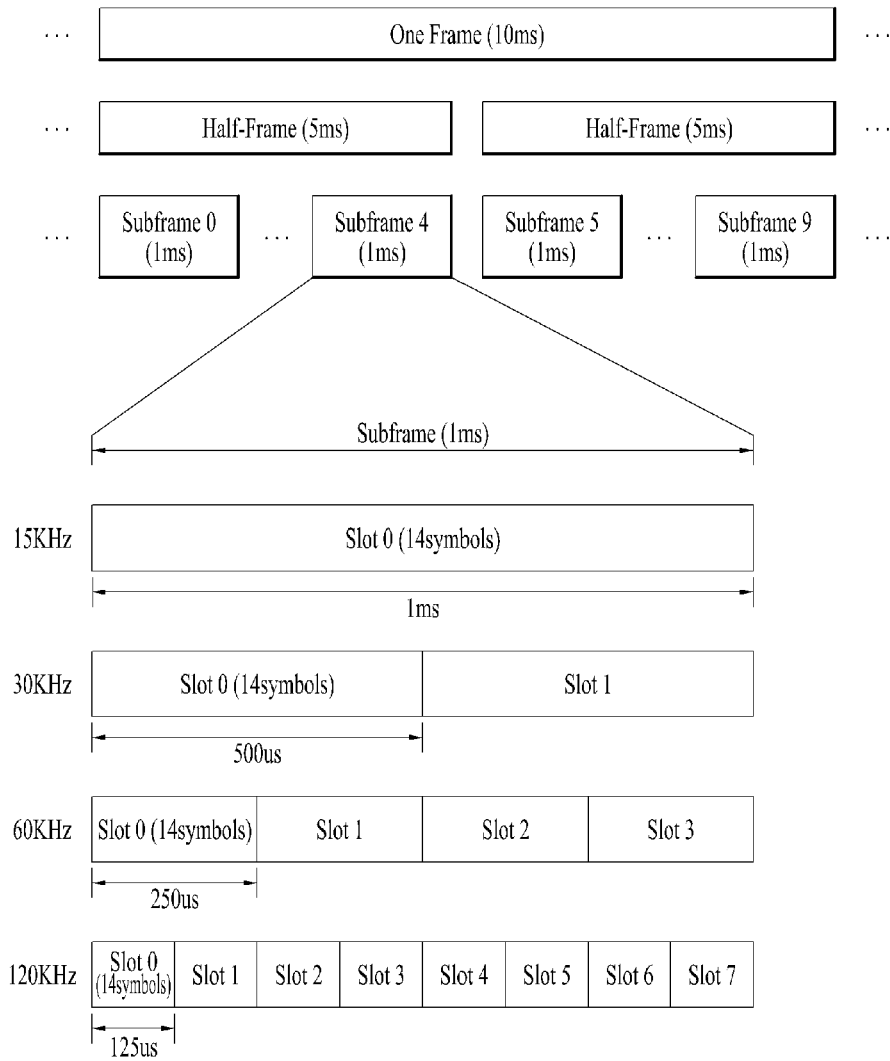
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} \cdot N_f / 100) \cdot T_c = 10$ ms and is divided into two half-frames of 5 ms each. A basic time unit for NR is $T_c = 1/(\Delta f_{max} \cdot N_f)$ where $\Delta f_{max} = 480 \cdot 10^3$ Hz and $N_f = 4096$. For reference, a basic time unit for LTE is $T_s = 1/(\Delta f_{ref} \cdot N_{f,ref})$ where $\Delta f_{ref} = 15 \cdot 10^3$ Hz and $N_{f,ref} = 2048$. $T_c$ and $T_f$ have the relationship of a constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u \cdot 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u \cdot 15$ kHz.

TABLE 2

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
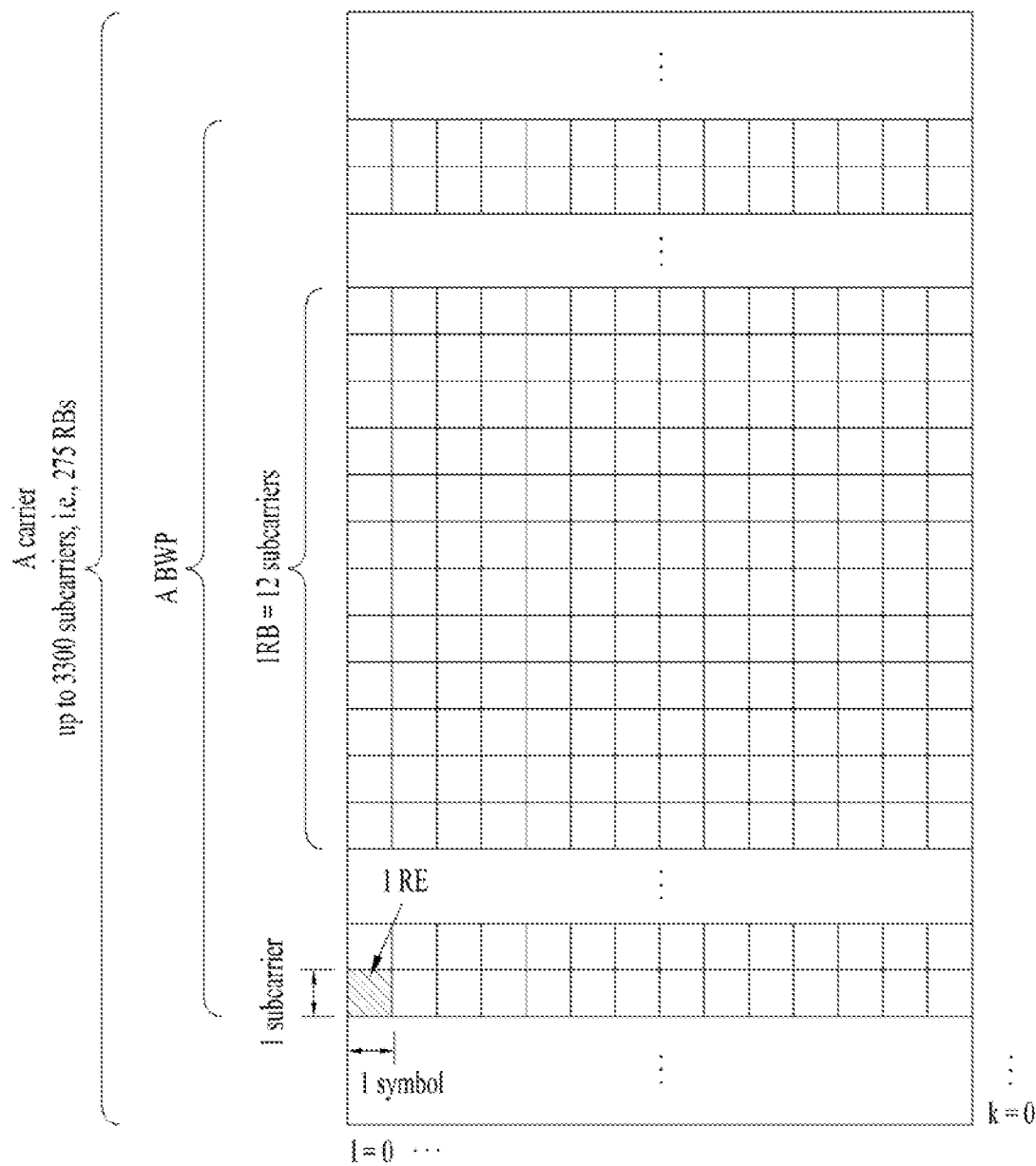
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} \cdot N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ rid for the subcarrier spacing configuration u is given to the UE by a higher layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP} = O_{Carrier} + RB_{start}$ and the number of contiguous RBs $N^{size}_{BWP} = L_{RB}$ provided by an RRC parameter locationAndBandwidth, which indicates an offset $RB_{set}$ and a length $L_{RB}$ as a resource indicator value (RIV) on the assumption of $N^{start}_{BWP} = 275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link recovery request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2
PUCCH resource set #1, if 2<the number of UCI bits=<$N_1$
. . .
PUCCH resource set #(K−1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4.

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: dynamic grant/assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCI format 0_2. Some implementations of the present disclosure may be applied to DL data reception based on DCI format 1_2.

Figure 6:
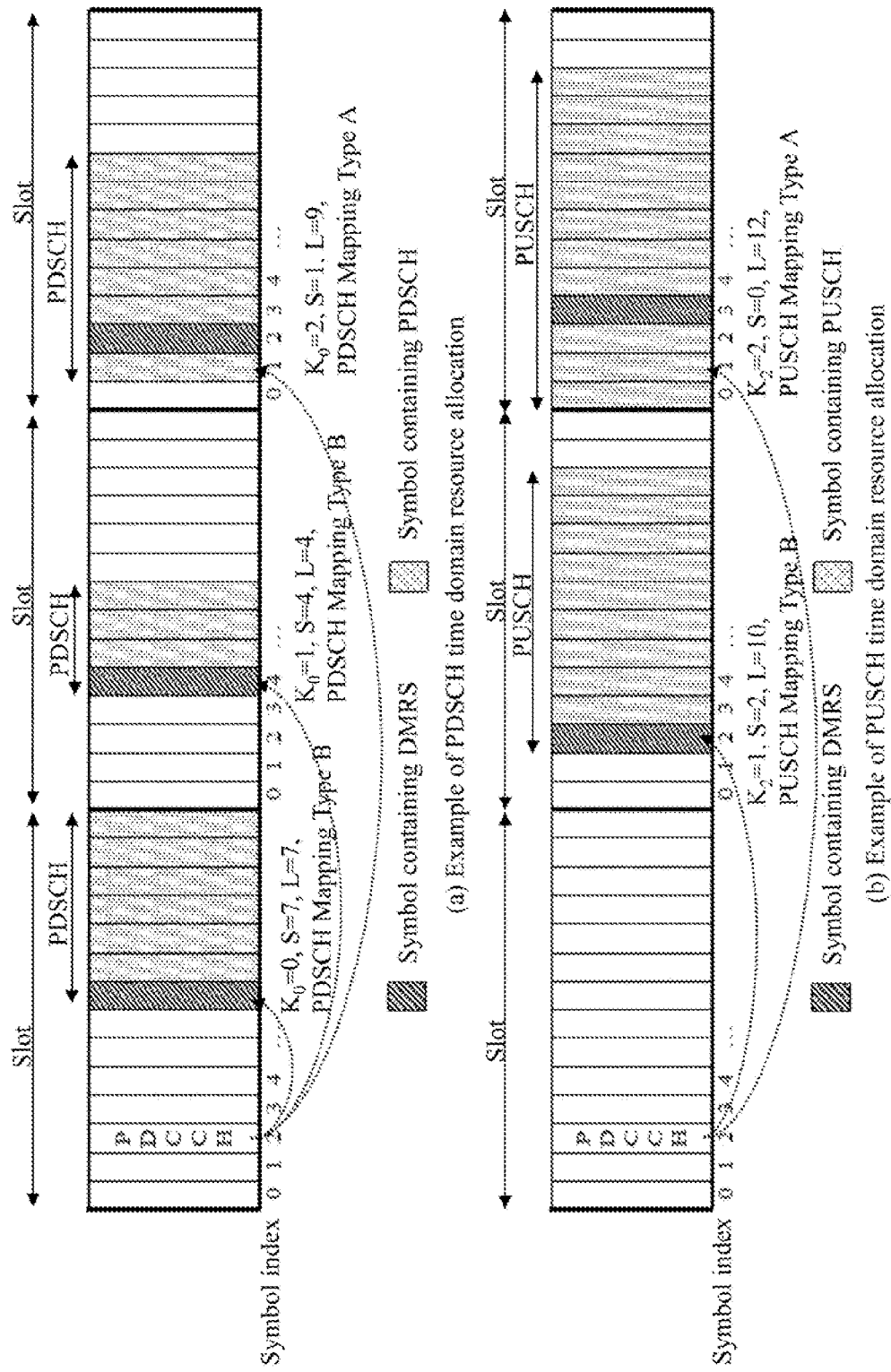
FIG. 6 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 6 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

For operations with shared spectrum channel access, a PDCCH may be used for the following purposes: triggering of search space set group switching; indication of available RB sets and a channel occupancy time duration to one or more UEs; and indication of DL feedback information for a configured grant PUSCH Resource Allocation by RRC As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*number OfSlotsPerFrame (numberOjSymbolsPerSlot)+(slot number in the frame*numberOJSymbolsPerSlot)+symbol number in the slot]=(timeDomainOffset*numberOJSymbolsPerSlot+S+ N*periodicity) modulo (1024*numberOfSlotsPerFrame*numberOjSymbolsPerSlot), for all N>=0, where numberOfSlotsPerFrame and numberOJSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:

[(SFN*numberOfSlotsPerFrame*numberOJSymbolsPerSlot)+(slot number in the frame*numberOJSymbolsPerSlot)+symbol number in the slot]= [(SFN$_{start\ time}$*numberOfSlotsPerFrame*numberOJSymbolsPerSlot+slot$_{start\ time}$*numberOfymbolsperSlot+symbol$_{start\ time}$)+N*periodicity] modulo (1024*numberOfSlotsPerFrame*numberOJSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOJSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-RetransmissionTimer, the HARQ process ID associated with the first symbol of UL transmission may be derived from the following equation: HARQ Process ID=[floor(CURRENT symbollperiodicity)] modulo nrofHARQ-Processes. For configured UL grants with harq-ProcID-Offset2, the HARQ process ID associated with the first symbol of UL transmission may be derived from the following equation: HARQ Process ID=[floor(CURRENT symbol/periodicity)] modulo nrofHARQ-Processes+harq-ProcID-Offset2, where CURRENT symbol= (SFN*numberOISlotsPerFrame*numberOJSymbolsPerSlot+slot number in the frame*numberOfSymbolsPerSlot+symbol number in the slot), and numberOfSlotsPerFrame and numberOJSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling (e.g., SPS configuration) used to configure a semi-persistent transmission:

cs-RNTI corresponding to a CS-RNTI for activation, deactivation, and retransmission;
nrofHARQ-Processes that provides the number of HARQ processes for SPS;
periodicity that provides a periodicity of configured DL assignment for SPS;
n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

Multiple DL SPS configurations may be configured within the BWP of a serving cell. After DL assignment is configured for SPS, the UE may consider sequentially that N-th DL assignment occurs in a slot satisfying: (numberOfSlotsPerFrame*SFN+slot number in the frame)= [(numberOfSlotsPerFrame*SFN$_{start\ time}$+Slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOJSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT slot*10/(numberOfSlotsPerFrame*periodicity))] modulo nrof-HARQ-Processes, where CURRENT slot= [(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID= [floor (CURRENT slot/periodicity)] modulo nrofHARQ-Processes+harq-ProcID-Offset, where CURRENT slot= [(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 4 and Table 5. Table 4 shows an example of special fields for DL SPS and UL grant Type 2 scheduling activation PDCCH validation, and Table 5 shows an example of special fields for DL SPS and UL grant Type 2 scheduling release PDCCH validation.

TABLE 4

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 5

|  | DCI format 0_0 | DCI format 1_0 |
|---|---|---|
| HARQ process number | set to all '0's | set to all '0's |
| Redundancy version | set to '00' | set to '00' |

TABLE 5-continued

|  | DCI format 0_0 | DCI format 1_0 |
|---|---|---|
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

The frequency resources for the DG PUSCH may be determined based on the FDRA field in scheduling DCI for the DG PUSCH. Regarding FDRA, a plurality of UL resource allocation methods (e.g., UL resource allocation type 0, UL resource allocation type 1, and UL resource allocation type 2) may be supported. If the scheduling DCI is configured to indicate the UL resource allocation type as part of the FDRA field by the RRC configuration for the PUSCH, the UE may use UL resource allocation type 0 or type 0 as defined by the FDRA field. Otherwise, the UE may the UL resource allocation type as defined by an RRC parameter resourceAllocaiton for the corresponding DCI format. Upon detecting a PDCCH intended for the UE, the UE may first determine a UL BWP and then determine resource allocation within the determined UL BWP. RB numbering starts from the lowest RB in the determined UL BWP.

Among various UL resource allocation types, UL resource allocation type 2 allocates a set of (equally spaced) non-contiguous RBs to the UE in the frequency domain. Such a set of non-contiguous RBs is referred to as interlaced RBs. UL resource allocation type 2 may be useful for spectrum scenarios (e.g., shared spectrum scenarios) where regulations such as occupied channel bandwidth (OCB) and power spectral density (PSD) constraints are applied.

Figure 7:
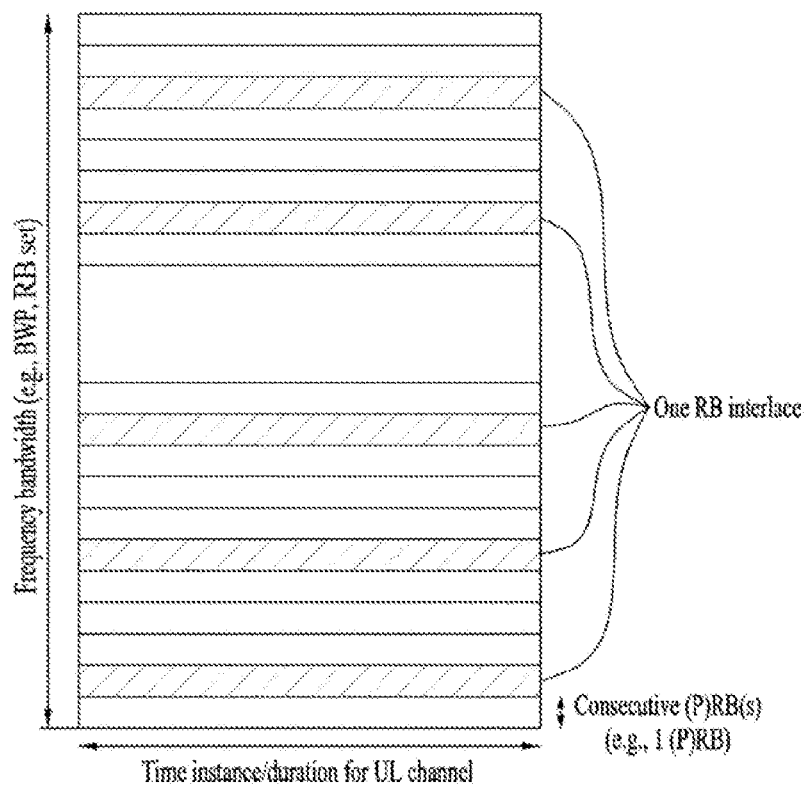
FIG. 7 illustrates interlaced resource blocks (RBs)

FIG. 7 illustrates interlaced RBs.

Referring to FIG. 7, multiple interlaces of RBs may be defined in the frequency domain. Interlace $m \in \{0, 1, \ldots, M-1\}$ may consist of common RBs: $\{m, M+m, 2M+m, 3M+m, \ldots \}$, where M denotes the number of interlaced RBs given by Table 6.

TABLE 6

| μ | M |
|---|---|
| 0 | 10 |
| 1 | 5 |

An interlaced RB within BWP i and interlace m, $n^u_{IRB,m} \in \{0, 1, \ldots\}$ and a CRB $n^u_{CRB}$ may be determined by the following: $n^u_{CRB} = M*n^u_{IRB,m} + N^{start,u}_{BWP,i}((m - N^{start,u}_{BWP,i}) \mod M)$.

Communication devices (e.g., UE) may use one or more interlaces to transmit a signal/channel. The signal/channel may include a PUCCH or PUSCH.

For example, in UL resource allocation type 2, resource block (RB) assignment information in DCI provides the UE with a set of up to M interlace indices and (for DCI format 0_0 monitored in a UE-specific search space and DCI format 0_1) a set of up to $N^{BWP}_{RB-set,UL}$ contiguous RB sets. In this case, the RB set consists of a plurality of contiguous RBs. In some implementations, the RB set may correspond to a frequency resource on which a channel access procedure (CAP) is separately performed in the shared spectrum. For operations with shared spectrum channel access, UL transmission subcarriers may be mapped to one or more PRB interlaces.

The UE may determine, as the frequency resources for PUSCH transmission, RB(s) corresponding to the intersection of i) indicated interlaces and ii) the union of indicated RB set(s) and guard bands between the indicated RB set(s) (if present).

In the case of u=0, the X most significant bits (MSBs) of the RB assignment information indicate to the UE a set of allocated interlace indices ($m_0$+l), where X is a positive integer (e.g., 6), and the indication consists of a resource indication value (RIV). When $<=RIV<M*(M+1)/2$, l=0, 1, ..., L−1. The RIV corresponds to i) the starting interlace index $m_0$ and ii) the number of contiguous interlace indices L (where L is a positive number). The RIV is defined as follows: if $(L-1)<=floor(M/2)$, then $RIV=M*(L-1)+m_0$ else $RIV=M*(M-L+1)+(M-1-m0)$. If $RIV>=M(M+1)/2$, the RIV corresponds to i) the starting interlace index $m_o$ and ii) a set of values 1 according to Table 7.

TABLE 7

| RIV − M(M + 1)/2 | $m_0$ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

In the case of u=1, the X MSBs of RB assignment information include a bitmap indicating interlaces allocated to the scheduled UE, where X is a positive integer (e.g., 5). The bitmap has a size of M bits with one bitmap bit per interlace. For example, interlaces #0 to #(M−1) are mapped to the MSB to least significant bit (LSB) of the bitmap, respectively. If the bit value in the bitmap is 1, the corresponding interlace is allocated to the UE. Otherwise the corresponding interlace is not allocated to the UE.

For DCI 0_0 monitored in a UE-specific search space and DCI format 0_1, if u=0 and u=1, the Y LSBs of the RB assignment information may indicate contiguously allocated RB set(s) for a PUSCH scheduled by i) DCI format 0_0 monitored in the UE-specific search space; ii) DCI format 0, or iii) a Type 1 or Type 2 configured grant, where Y=ceil $\{\log_2(N^{BWP}_{RB-set,UL}*(N^{BWP}_{RB-set,UL}+1)/2)\}$, where $N^{BWP}_{RB-set,U}$ denotes the number of RB sets configured in the UL BWP. If $0<=RIV_{RBset}<N^{BWP}_{RB-set,UL}*(N^{BWP}_{RB-set,UL}+1)/2$, l=0, 1, ..., $L_{RB-set}$−1. The RIV corresponds to i) the starting RB set index $RB^{start}_{RB-set,UL}$ and ii) the number of contiguous RB set(s) $L_{RB-set}$. The RIV may be defined as follows: if $L_{RB-set}-1<=$floor ($N^{BWP}_{RB-set,UL}/2$), $RIV_{RBset}=N^{BWP}_{RB-set,UL}*(L_{RB-set}-1)+N^{BWP}_{RB-set,UL}$ else $RIV_{RBset}=N^{BWP}_{RB-set,UL}*(N^{BWP}_{RB-set,UL}-L_{RB-set}+1)+(N^{BWP}_{RB-set,UL}-L_{RB-set}-N^{start}_{RB-set,UL})$, where $N^{start}_{RB-set,UL}=0, 1, \ldots, N^{BWP}_{RB-set,UL}-1$, $L_{RB-set}>=1$, and, $L_{RB-set}$ does not exceed $N^{BWP}_{RB-set,UL}-N^{start}_{RB-set,UL}$.

FIG. 8 illustrates UL resource allocation based on interlaced RBs.

Referring to FIG. 8(a), based on resource allocation (RA) information for a PUSCH indicating {interlace #1, RB set #1}, RBs belonging to interlace #1 in RB set #1 may be determined to be PUSCH resources. In other words, the RBs corresponding to the intersection of {interlace #1, RB set #1} may be determined as the PUSCH resources. Referring to FIG. 8(b), based on the RA information for the PUSCH indicating {interlace #2, RB set #1/#2}, RBs belonging to interlace #2 in RB sets #1 and #2 may be determined to be PUSCH resources. In this case, a guard band (i.e., GB #1) between RB set #1 and RB set #2 may also be used as a PUSCH transmission resource. That is, the RBs corresponding to the intersection of {interlace #1, RB set #1+RB set #2+GB #1} may be determined as the PUSCH resources. In this case, a GB that is adjacent to RB sets #1 and #2 but is not between RB set #1 and RB set #2 (i.e., GB #0) may not be used as a PUSCH transmission resource.

A control resource set (CORESET), which is a set of time-frequency resources on which the UE is capable of monitoring a PDCCH, may be defined and/or configured. One or more CORESETs may be configured for the UE. The CORESET has a time duration of one to three OFDM symbols and includes a set of PRBs. The PRBs included in the CORESET and the CORESET duration may be provided to the UE through higher layer (e.g., RRC) signaling. The UE may monitor a set of PDCCH candidates in the configured CORESET(s) according to corresponding search space sets. In this document, monitoring implies decoding (blind decoding) of each PDCCH candidate based on monitored DCI formats. A master information block (MIB) on a PBCH provides the UE with parameters (e.g., CORESET #0 configuration) for monitoring a PDCCH scheduling a PDSCH carrying system information block 1 (SIB1). The PBCH may indicate that there is no associated SIB1. In this case, the UE may be provided with not only a frequency range where the UE may assume that there is no SSB associated with SSB1 but also another frequency range where the UE may discover the SSB associated with SIB1. CORESET #0, which is a CORESET for scheduling at least SIB1, may be configured through the MIB or dedicated RRC signaling.

The set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. A search space set s is determined based on the following parameters provided by the BS to the UE.

- controlResourceSetId: An indicator for identifying a CORESET p associated with the search space set s;
- monitoringSlotPeriodicityAndOffset: A PDCCH monitoring periodicity of $k_s$ slots and a PDCCH monitoring offset of $o_s$ slots for configuring slots for PDCCH monitoring;
- duration: a duration of $T_s<k_s$ slots indicating the number of slots in which the search space set s exists;
- monitoringSymbolsWithinSlot: An in-slot PDCCH monitoring pattern indicating the first symbol(s) of a CORESET in slots for PDCCH monitoring;
- nrofCandidates: The number of PDCCH candidates for each control channel element (CCE) aggregation level; and
- searchSpaceType: an indication indicating whether the search space set s is a CCE set or a USS set.

The parameter monitoringSymbolsWithinSlot indicates, for example, the first symbol(s) for PDCCH monitoring in slots configured for PDCCH monitoring (see parameters monitoringSlotPeriodicityAndOffset and duration). For example, if monitoringSymbolsWithinSlot is 14 bit, the bits of monitoringSymbolsWithinSlot may represent 14 OFDM symbols in a slot, respectively, such that the most significant (left) bit represents the first OFDM symbol in the slot and the second most significant (left) bit represents the second OFDM symbol in the slot. For example, bit(s) set to 1 among the bits of monitoringSymbolsWithinSlot identify the first symbol(s) of a CORESET in slots.

The UE monitors PDCCH candidates only on PDCCH monitoring occasions. The UE determines PDCCH monitoring occasions in an active DL BWP in slots based on a PDCCH monitoring periodicity, a PDCCH monitoring offset, and a PDCCH monitoring pattern. In some implementations, for the search space set s, the UE may determine that PDCCH monitoring occasion(s) exist in a slot numbered $n_{u,s,f}$ of a frame numbered of if $(n_f*N^{frame,u}_{slot}+n^{u}_{s,f}-o_s) \mod k_s=0$. That is, the UE monitors PDCCH candidates for the search space set s in $T_s$ consecutive slots, starting from slot $n^{u}_{s,f}$, but the UE does not monitor PDCCH candidates for the search space set s in subsequent $k_s-T_s$ consecutive slots.

Table 8 below shows search space sets, relevant RNTIs, and use cases.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 9 shows DCI formats carried by a PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

TABLE 9-continued

| DCI format | Usage |
|---|---|
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, each of DCI format 0_0 and DCI format 1_0 has a fixed size after the size of a BWP is initially given by RRC. For a USS, except for a frequency domain resource assignment (FDRA) field, the remaining fields of each of DCI format 0_0 and DCI format 1_0 have fixed sizes. However, the size of the FDRA field may be changed by the configuration of related parameters by the BS. For DCI format 0_1 and DCI format 1_1, the size of a DCI field may be changed by various RRC reconfigurations by the BS. DCI format 2_0 may be used to provide dynamic slot format information (e.g., SFI DCI) to the UE, and DCI format 2_1 may be used to provide DL pre-emption information to the UE. Further, DCI format 2_4 may be used to inform UL resources on which the UE needs to cancel UL transmission.

In some scenarios (e.g., NR Rel-16), the BS may indicate resources on which UE(s) need to cancel UL transmission using contiguous reference time/frequency resources and a bitmap, and the UE may cancel the UL transmission indicated or configured on the corresponding resources.

Figure 9:
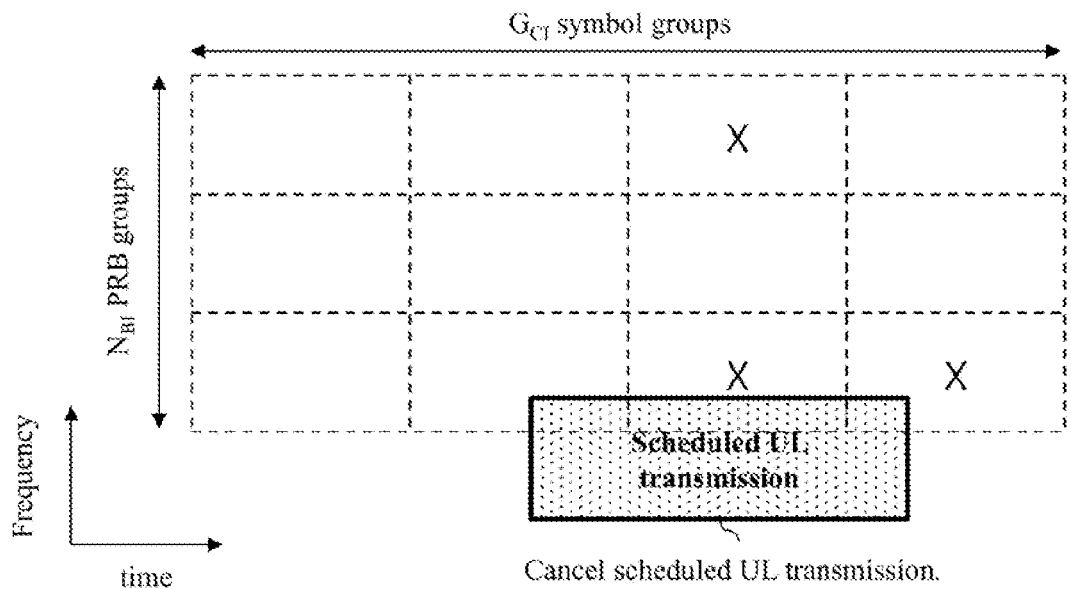
FIG. 9 illustrates an uplink cancellation indication (UL CI) used in some scenarios.

FIG. 9 illustrates an uplink cancellation indication (UL CI) used in some scenarios. Specifically, FIG. 9 shows the UL CI for a serving cell based on DCI format 2_4.

The BS may cancel SRS transmission of the UE for others UE having PUSCH transmission, repetitive PUSCH transmission, or latency-critical transmission. The BS may configure UEs to monitor canceled transmission indications using a cancellation indication RNTI (CI-RNTI) on a PDCCH. For example, when the UE receives an RRC configuration UplinkCancellation, the UE may attempt to detect DCI format 2_4 based on the CI-RNTI in the RRC configuration UplinkCancellation. When the UE receives the canceled transmission indication, the UE cancels PUSCH transmission from the earliest symbol overlapping with the resource or SRS transmission overlapping with the resource indicated by cancellation. The RRC configuration UplinkCancellation may provide the UE with a set of serving cells through ci-ConfigurationPerCell; a set of positions of fields in DCI format 2_4 through positionInDCI; the size of an information payload for DCI format 2_4 through dci-PayloadSize-ForCI; and an indication for time-frequency resources through timeFrequencyRegion. For a serving cell having an associated field in DCI format 2_4, for the above field, No means the field size (i.e., the number of bits) for each UL CI of the serving cell and is provided by the RRC parameter ci-PayloadSize. $B_{CI}$ means the number of PRBs and is provided by an RRC parameter frequencyRegionForCI for configuring a reference frequency region to which the detected UL CI is applicable. To means the number of symbols except for symbols for reception of SS/PBCH blocks and DL symbols indicated by tdd-UL-DL-ConfigurationCommon among symbols provided by time-DurationForCI in timeFrequencyRegion if the PDCCH monitoring periodicity for a search space set of DCI format 2_4 is one slot and there are more than one PDCCH monitoring occasion in a slot. Otherwise, To means the number of symbols except for the symbols for reception of SS/PBCH blocks and the DL symbols indicated by tdd-UL-DL-ConfigurationCommon among symbols corresponding to the PDCCH monitoring periodicity. $G_{CI}$ means the number of partitions for To symbols provided by timeGranularityforCI in timeFrequencyReion for the serving cell.

The indication by DCI format 2_4 for a serving cell is applicable to PUSCH transmission or SRS transmission on the serving cell.

$G_{CI}$ sets of bits from the MSB of No bits for a serving cell in DCI format 2_4 have a one-to-one mapping relationship with symbols of $G_{CI}$ groups, where each of the first $G_{CI}$–$T_{CI}$+(floor($T_{CI}/G_{CI}$))*$G_{CI}$ groups includes floor($T_{CI}/G_{CI}$) groups and Each of the remaining $T_{CI}$–(floor($T_{CI}/G_{CI}$))*$G_{CI}$ groups includes ceil($T_{CI}/G_{CI}$) symbols. The UE determines a symbol duration for the SCS configuration of a DL BWP where the UE monitors a PDCCH for detection of DCI format 2_4.

For a group of symbols, $N_{BI}$=$N_{CI}/G_{CI}$ bits from the MSB of each set of bits have a one-to-one mapping relationship with $N_{BI}$ groups of PRBs, where each of the first $N_{BI}$–$B_{CI}$+(floor($B_{CI}/N_{BI}$))*$N_{BI}$ groups includes floor($B_{CI}/N_{BI}$) PRBs and each of the remaining $B_{CI}$–(floor($B_{CI}/N_{BI}$))*$N_{BI}$ groups includes ceil($B_{CI}/N_{BI}$) PRBs.

In the example of FIG. 9, it is assumed that $N_{CI}$=12 and $G_{CI}$=4 are configured for the serving cell and the field value for the serving cell among field values in DCI format 2_4 is 001000000011. Referring to FIG. 9, upon detecting DCI format 2_4, the UE may cancel UL transmission scheduled for the serving cell if the scheduled UL transmission overlaps with a time-frequency resource denoted by "X" among 9 time-frequency resources defined by $G_{CI}$ symbol groups and $N_{BI}$ PRB groups.

As shown in the example of FIG. 9, for a UL CI using the DCI format 2_4, UL transmission is canceled for a serving cell in units of at least $B_{CI}$ contiguous PRBs in the frequency domain. However, if a UL CI is signaled as described in FIG. 9 for a BWP or serving cell to which interlaced RB-based resource allocation is applied, UL transmission on interlaced RB(s) that do not actually need to be canceled may also be canceled. Therefore, a UL CI suitable for the interlaced RB-based resource allocation is required. For example, when the UE uses a subband (e.g., RB set) and a PRB interlace (e.g., interlaced RB) in an unlicensed band (e.g., shared spectrum), the UE may use non-contiguous frequency resources. The use of these non-contiguous frequency resources may be made by partial listen-before-talk (LBT) success of the UE or scheduling of the BS. As shown in FIG. 9, if a method of canceling UL transmission based on contiguous reference time/frequency resources is applied to UL transmission using non-contiguous frequency resources, the BS may not accurately indicate resources to be used by the UE. As a result, unnecessary UL transmission cancellation may occur, or it may be difficult to perform transmission cancellation per subband. This issue may be somewhat alleviated if the BS configures and signals a plurality of time-frequency regions to which the UL CI is applicable. However, this may increase the burden of PDCCH monitoring in the UE and cause signaling overhead on control channels.

Therefore, in some implementations of the present disclosure, a UL CI is configured to indicate non-contiguous resources in the frequency domain. In some implementations of the present disclosure, upon receiving a UL CI regarding non-contiguous frequency resources, the UE may cancel or interrupt previously configured or indicated UL transmission.

Hereinafter, to cancel UL transmission of the UE, methods of configuring a reference resource region in consideration of RB sets and PRB interlaces and methods and procedures for indicating RB sets and subbands to be used by the UE for UL transmission in the configured reference resource region will be described.

UE Side

Figure 10:
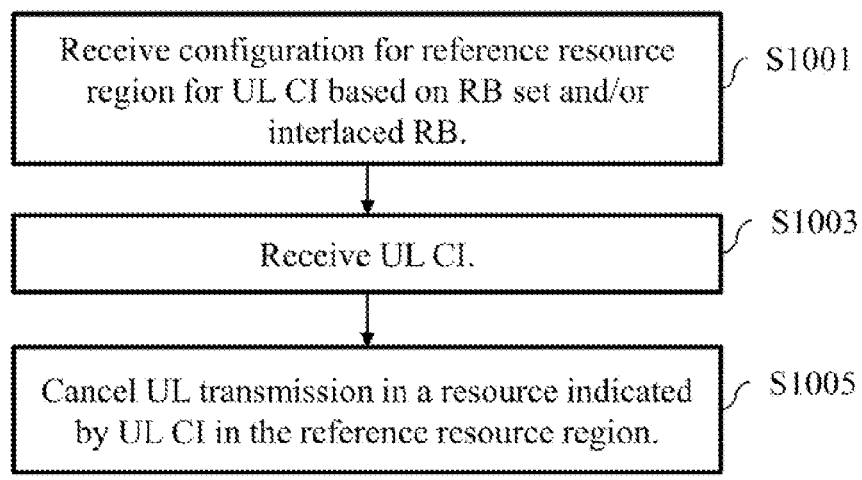
FIG. 10 illustrates an example of UE operation flows according to some implementations of the present disclosure.

FIG. 10 illustrates an example of a UE operation flow according to some implementations of the present disclosure.

Before receiving a UL CI, the UE may receive RRC parameters for configuring a reference resource region to which the UL CI is applicable in units of RB sets and/or PRB interlaces (S1001). When the UE receives the UL CI (S1003), the UE may determine canceled resources (e.g., interlaced RB) in the reference resource region and cancel previously scheduled UL transmission on the canceled resources according to some implementations of the present disclosure (S1005).

The following UE operations may be considered in implementations of the present disclosure.

<Implementation A1> RB Set Based Reference Resource Region for UL CI

The UE may receive RB set(s) that may be indicated by a UL CI from the BS through higher layer signaling. For example, when the UE operates in an unlicensed band, the UE performs UL transmission based on a CAP in units of RB sets. Thus, the UL transmission may also be performed in units of RB sets. Considering this point, if resources indicated by a UL CI are represented in units of RB sets to effectively indicate transmission using only some RB sets through the UL CI, the UE transmission in the unlicensed band may be effectively indicated with small signaling overhead.

In some implementations, the UE may receive RB set(s) that may be indicated by a UL CI from the BS in advance. If the reference resource region for the UL CI is limited to some RB set(s) as described above, the burden of PDCCH monitoring in the UE may be reduced, and the signaling overhead of the UL CI may be reduced. In this case, the RB sets set as the reference resource region to which the UL CI is applicable may be some or all of the entire RB sets defined in a UL cell, and the entirety or part of the reference resource region may be indicated in UL CI DCI. For example, some of the RB sets considering the intra-cell guard band described in Section 7 of 3GPP TS 38.214 V16.3.0 may be indicated as the RB set(s) for the reference resource region for the UL CI. When the maximum number of configurable RB sets is X (e.g., 5), RB set(s) that may be indicated by the UL CI through an RRC parameter having a size of X bits for the UL CI, that is, the reference resource region may be determined.

<Implementation A2> Interlaced RB Based Reference Resource Region for UL CI The UE may receive a set of interlaced RBs, which may be indicated by a UL CI, from the BS through higher layer signaling (e.g., RRC signaling).

For example, when the UE operates in an unlicensed band, the UE may determine UL resources by being scheduled with RB sets and interlaced RBs in the RB sets. Considering this point, to effectively cancel transmission using some interlaced RBs without unnecessary cancellation of UE transmission using other interlaced RBs through a UL CI, it may be considered to represent resources indicated by the UL CI based on an interlaced RB structure. To this end, a set of interlaced RBs (i.e., reference interlaced RB(s)) that may be indicated by the UL CI may be configured to the UE. If the reference resource region for the UL CI is limited to some interlaced RB(s) as described above, the burden of PDCCH monitoring in the UE may be reduced, and the signaling overhead of the UL CI may be reduced.

In this case, a predetermined number of interlaced RB(s) may be used per RB set. For example, a certain number of interlaced RBs may be set as the reference resource region for the UL CI for each RB set. To determine the number of interlaced RBs per RB set, a specific SCS (i.e., reference SCS) may be assumed, and the number of interlaced RBs per RB set may be determined based on this assumption. For example, assuming an SCS of 15 kHz, 10 interlaced RBs may be used per RB set. As another example, assuming an SCS of 30 kHz, 5 interlaced RBs may be used per RB set.

When interlaced RBs are determined on the assumption of an SCS of X kHz and the interlaced RBs are applied to a UL BWP with an SCS of Y kHz (where X<Y), a set of interlaced RBs, interlaced RB set A including Y/X contiguous interlaced RBs, which may be indicated by a UL CI, may be interpreted as one interlaced RB, interlaced RB B in the corresponding UL BWP. In other words, the UE may interpret indicating PRBs with interlace indices of {0/1, 2/3, 4/5, 6/7, 8/9} for the 15 kHz SCS as equivalent to indicating PRBs with interlace indices of {0, 1, 2, 3, 4} for the 30 kHz SCS. In this case, if at least one interlaced PRB among the interlaced PRBs included in interlaced RB set A is indicated, the UE may assume that the entirety of interlaced RB B is indicated. For example, even when only interlace index 1 is indicated for the 15 kHz SCS, the UE may assume that interlace index 0 is indicated for the 30 kHz SCS. Specifically, when an interlaced RB with index a, which is determined on the assumption of an SCS of X kHz, is applied to a UL BWP with an SCS of Y kHz, the UE may interpret that index a indicates one interlaced RB, interlaced RB B with index b=floor(a/(Y/X)).

When interlaced RBs are determined on the assumption of an SCS of Y kHz and the interlaced RBs are applied to a UL BWP with an SCS of X kHz (where X<Y), one interlaced RB, interlaced RB A', which may be indicated by a UL CI, may be interpreted as a set of interlaced RBs, interlaced RB set B' including Y/X contiguous interlaced RBs in the corresponding UL BWP. In other words, the UE may interpret indicating PRBs with interlace indices of {0, 1, 2, 3, 4} for the 30 kHz SCS as equivalent to indicating PRBs with interlace indices of {0/1, 2/3, 4/5, 6/7, 8/9} for the 15 kHz SCS. For example, when the index of interlaced RB A' is a', interlaced RB set B' may include Y/X contiguous interlaced RBs from an interlaced RB having index of a'*(Y/X).

In this case, interlaced RBs, which are set as the reference resource region, may be configured separately for each RB set defined on a UL carrier. For example, interlaced RBs for the reference resource region may be configured for each RB set. In this case, the number of interlaced RBs configured for the UL CI reference resource region may vary per RB set. Alternatively, the reference SCS, which is configured to determine the number of interlaced RBs per RB set, may vary.

For example, if an SCS of 15 kHz (ie u=0) is assumed or 10 interlaced RBs are assumed per RB set, indicatable reference interlaced RB(s) may be determined by a 6-bit RRC parameter for representing contiguous interlaced RBs, or the reference interlaced RB(s) may be determined by a 10-bit bitmap for representing non-contiguous interlaced RBs. In some implementations, the method of determining X MSBs of RB resource allocation for u=0 in UL resource allocation type 2 described above may be used to represent the contiguous interlaced RBs.

As another example, if an SCS of 30 kHz (i.e. u=1) is assumed or 5 interlaced RBs are assumed per RB set, indicatable reference interlaced RB(s) may be determined by a 5-bit bitmap for representing non-contiguous interlaced RBs.

<Implementation A3> Frequency Domain Resource Indication for UL CI with Interlaced RB When the UE receives a UL CI from the BS and determines the position of UL time/frequency resources indicated by the UL CI based on the reference resource configuration according to Implementation A1 and/or Implementation A2, the UE may determine UL frequency resources indicated by the UL CI based on the following information: information X and Y included in the UL CI.

Figure 11:
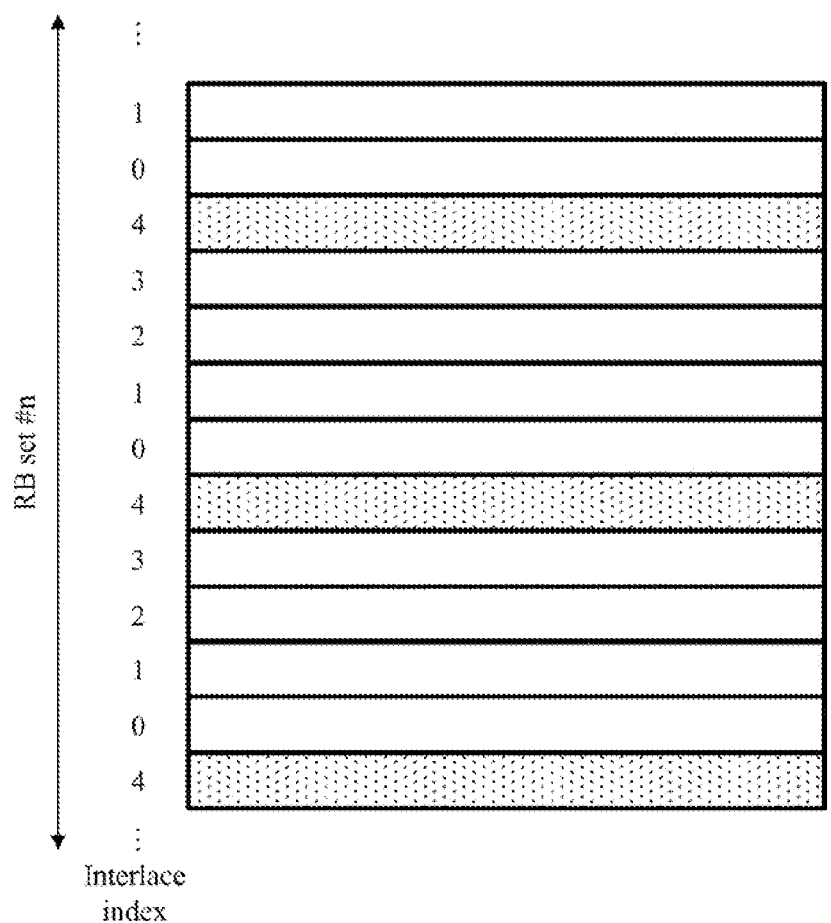
FIG. 11 illustrates resources canceled by a UL CI according to some implementations of the present disclosure.

FIG. 11 illustrates resources canceled by a UL CI according to some implementations of the present disclosure.

For example, when the UE receives a UL CI indicating interlaced RB #4 in a state that RB set #n is configured as the reference resource region, if there is UL transmission that overlaps with interlaced RB #4 in RB set #n, the UE may cancel the UL transmission.

<Implementation A3-1> Information X Indicating Interlaced RB in UL CI

In some implementations, a UL CI may include first information, information X indicating interlaced RBs. The first information, information X may be a bitmap consisting of a minimum of one bit and a maximum of 5 or 10 bits, and the information length and maximum information length may be determined by a reference SCS. Among SCSs used for a UL carrier configured to the UE, the smallest SCS may be used as the reference SCS, or the SCS of a DL BWP in which a PDCCH carrying the UL CI is transmitted may be used as the reference SCS. Alternatively, the smaller one of the two SCSs may be used as the reference SCS. For example, the reference SCS may be a smaller SCS configuration among i) the SCS configuration of the PDCCH and ii) the smallest SCS $u_{UL}$ provided by scs-SpecificCarrierList of FrequencyInfoUL-SIB or FrequencyInfoUL. Alternatively, the reference SCS may be included as an explicit RRC parameter in the UL CI configuration.

The maximum information length may be 10 bits when the reference SCS is 15 kHz or 5 bits when the reference SCS is 30 kHz.

The first information, information X may be configured with an MSB bitmap mapped to from the lowest interlace index to the MSB, and each bit may indicate an interlaced RB with a corresponding index.

For example, the UE may assume that the reference SCS is 30 kHz. In this case, the UE may assume that the information length of a UL CI is always 5 bits, which is the maximum length. This allows different UEs to have the same UL CI information length when a plurality of UEs receive the UL CI in group-common DCI on the same PDCCH. Considering that the BS needs to configure a different UE group for UE(s) having different UL CI information lengths, if UEs are capable of having the same UL CI information length, PDCCH overhead may be reduced due to the group-common DCI.

When interlaced RBs are indicated by a UL CI for which the reference SCS is X kHz and the interlaced RBs are applied to a UL BWP with an SCS of Y kHz (where X<Y), a set of interlaced RBs, interlaced RB set A including Y/X contiguous interlaced RBs, which may be indicated by the UL CI, may be interpreted as one interlaced RB, interlaced RB B in the corresponding UL BWP. In other words, the UE may interpret indicating PRBs with interlace indices of {0/1, 2/3, 4/5, 6/7, 8/9} for the 15 kHz SCS as equivalent to indicating PRBs with interlace indices of {0, 1, 2, 3, 4} for the 30 kHz SCS. In this case, if at least one interlaced PRB among the interlaced PRBs included in interlaced RB set A is indicated by the UL CI, the UE may assume that the entirety of interlaced RB B is indicated by the UL CI. For example, even when only interlace index 1 is indicated for the 15 kHz SCS, the UE may assume that interlace index 0 is indicated for the 30 kHz SCS. Specifically, when an interlaced RB with index a, which is determined on the assumption of an SCS of X kHz, is applied to a UL BWP with an SCS of Y kHz, the UE may interpret that the interlaced RB with index a is one interlaced RB, interlaced RB B with index b=floor(a/(Y/X)).

When interlaced RBs are indicated by a UL CI for which the reference SCS is Y kHz and the interlaced RBs are applied to a UL BWP with an SCS of X kHz (where X<Y), one interlaced RB, interlaced RB A', which may be indicated by the UL CI, may be interpreted as a set of interlaced RBs, interlaced RB set B' including Y/X contiguous interlaced RBs in the corresponding UL BWP. In other words, the UE may interpret indicating PRBs with interlace indices of {0, 1, 2, 3, 4} for the 30 kHz SCS as equivalent to indicating PRBs with interlace indices of {0/1, 2/3, 4/5, 6/7, 8/9} for the 15 kHz SCS. For example, when the index of interlaced RB A' is a', interlaced RB set B' may include Y/X contiguous interlaced RBs from an interlaced RB having index of a'*(Y/X).

<Implementation A3-2> Information Y Indicating RB Set in UL CI

In some implementations, a UL CI may include second information, information Y indicating RB sets. The second information, information Y may be a bitmap consisting of $N_{refRB-set}$ bits, where $N_{refRB-set}$ may be the number of RB sets included in a reference frequency region. Alternatively, $N_{refRB-set}$ may be the total number of RB sets configured according to Implementation A1.

The second information, information Y may be configured with an MSB bitmap mapped to from the lowest RB set index to the MSB, and each bit may indicate an RB set with a corresponding index.

In some implementations, information Y may not be included in the UL CI, or the information length thereof may be assumed to be zero bits based on higher layer signaling from the BS. In other words, whether information Y is included in the UL CI may be determined based on the higher layer signaling from the BS. If information Y is not included, the UE may always assume that all RB set(s) of the (configured) reference frequency region are indicated.

<Implementation A3-3> Information X and Y Indicating Interlaced RB in Interlaced RB Set in UL CI When information X and Y are capable of being included in a UL CI, the following may be considered.

Alt 1: If information Y is not included or has a length of zero bits, the UE may determine indicated interlaced RB sets by applying information X to all RB set(s) of a reference frequency region. For example, when RB set #1 and RB set #2 are set to the reference frequency region, and information X in a UL CI received by the UE indicates interlaced RB #0, the UE may cancel scheduled UL transmission that overlaps with interlaced RB #0 of RB set #1 and interlaced RB #0 of RB set #2.

Alt 2: If information X is not included or has a length of zero bits, a UL CI may include N refRB-set fields for information Y. Each field for information Y may sequentially indicate all interlaced RBs included in each RB set from the lowest RB set index.

Alt 3: When the length of information Y is greater than zero bits and the bit value(s) of information Y are all zero, the UE may ignore the corresponding UL CI.

Alt 4: When both information X and information Y are included in a UL CI, if the length of information Y is greater than zero bits, the length of information X is greater than zero bits, and the bit values of information X are all zero, the UE may assume that all PRBs in one or more RB sets indicated by the UL CI are indicated by the UL CI.

<Implementation A3-4> Priority Handling with Information X and Y for UL CI

In some implementations, when a UL CI is capable of indicating certain UL resources in more than one method, the UE may perform different UE operations for UL transmission that is not canceled by the UL CI for each method. The UL CI may include information on whether UL transmission of a high priority is to be canceled.

For example, when the UL CI indicates frequency-domain resources in the first information, information X and/or the second information, information Y, if the values of information X are all zero, the UE may assume that all interlaced RBs, including UL resource A in an indicated RB set, are indicated by the UL CI. Alternatively, if the bit value of information X corresponding to a certain interlaced RB is indicated as 1, UL resource A may be explicitly indicated by the UL CI. In both cases, the UE may cancel UL transmission using UL resource A. However, for UL transmission B using UL resource A but not canceled by the UL CI, for example, UL transmission with a higher priority than that of UL transmission canceled by the UL CI, or for UL transmission scheduled by DCI received after reception of the UL CI, the UE may perform different UE operations depending on how the UL CI indicates UL resource A.

In some implementations, if UL resource A is included in the UL CI and indicated by information X whose bit values are all zero, the UE may perform UL transmission B after performing the CAP based on LBT. If UL resource A is included in the UL CI and indicated by information X whose bit values are not all zero, the UE may perform UL transmission B without performing the CAP based on LBT.

Figure 12:
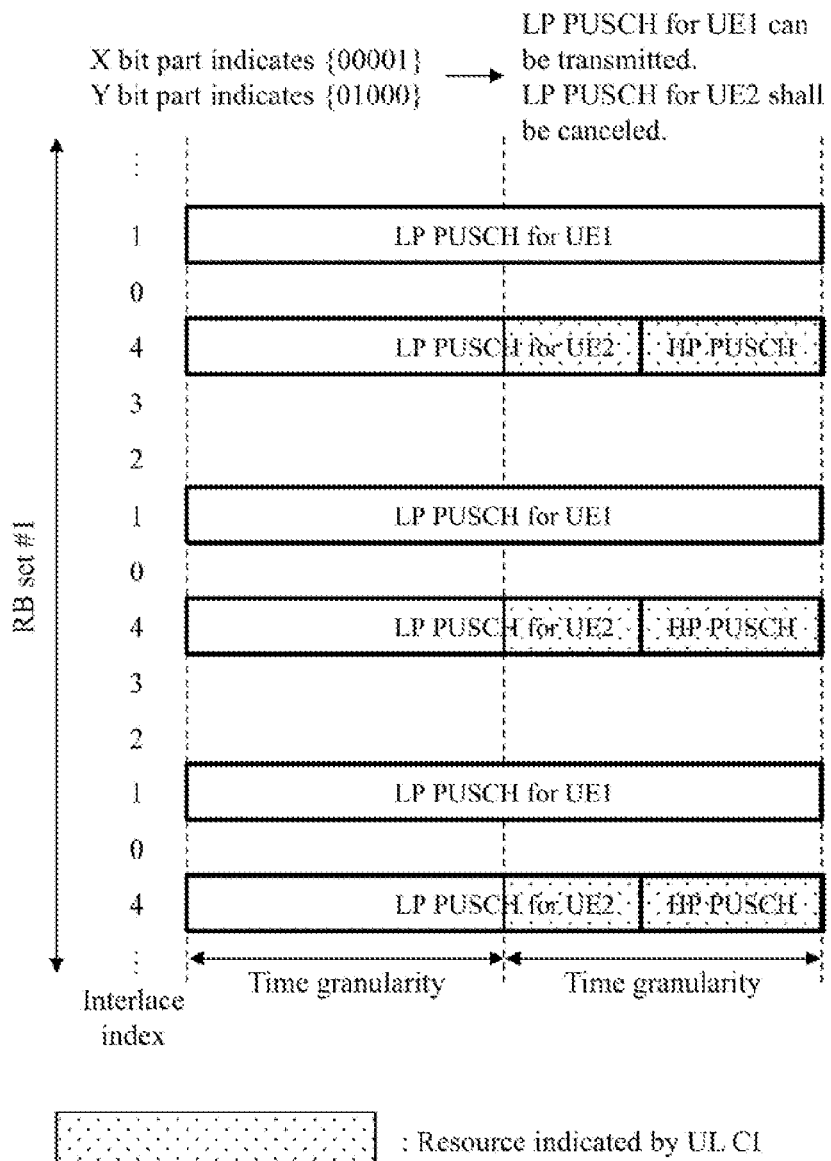
FIGS. 12 and 13 illustrate UE operations for performing UL transmission that is not cancelled by a UL CI according to some implementations of the present disclosure.
Figure 13:
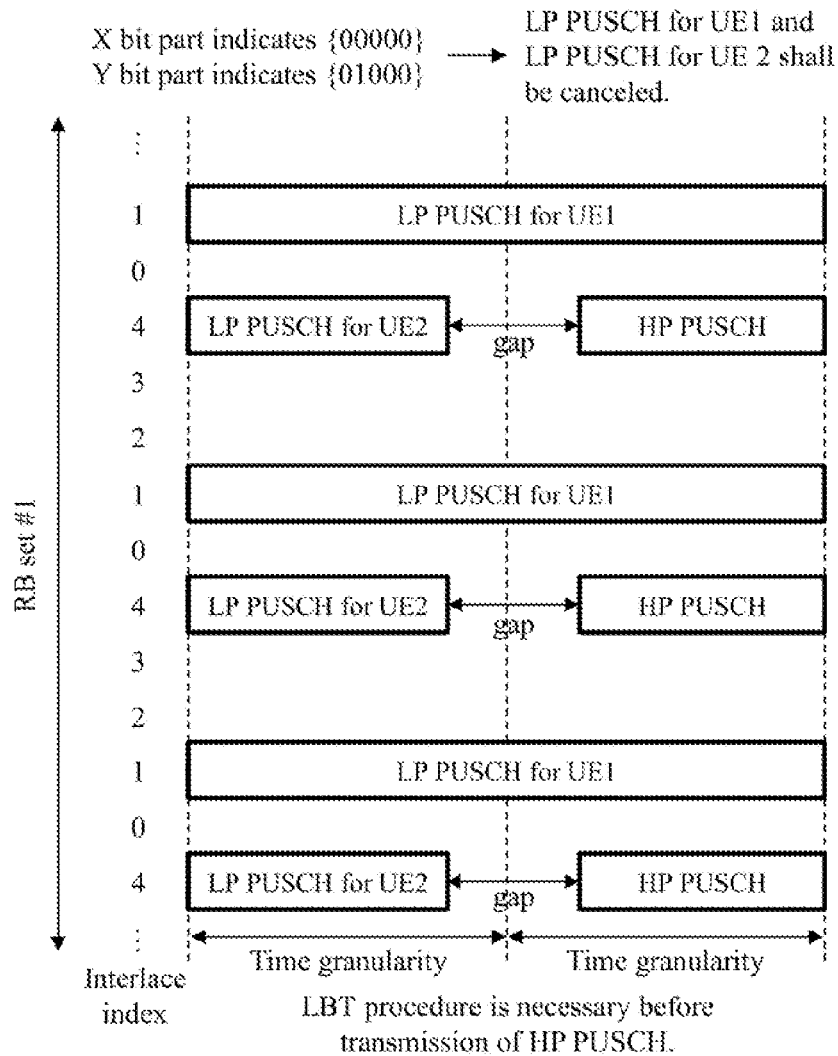

FIGS. 12 and 13 illustrate UE operations for performing UL transmission that is not cancelled by a UL CI according to some implementations of the present disclosure. Specifically, FIG. 12 shows UE operations for performing the UL transmission not canceled by the UL CI without LBT, and FIG. 13 shows UE operations for performing the UL transmission not canceled by the UL CI after LBT.

Referring to FIG. 12, when the BS schedules a low priority (LP) PUSCH for UE1 in interlaced RB #1 in RB set #1 and an LP PUSCH for UE2 in interlaced RB #4 in RB set #1, if the BS schedules a high priority (HP) PUSCH in interlaced RB #4 in RB set #1 as illustrated in FIG. 12, it is not necessary to perform LBT again in interlaced RB #4 because interlaced RB #4 is reserved for PUSCH transmission of UE2. Accordingly, the BS may transmit to UE(s), for example, a UL CI of which an X-bit part and a Y-bit part are 1000011 and {01000}, respectively according to some implementations of the present disclosure. Upon receiving the UL CI, UE1 may transmit the scheduled LP PUSCH in interlaced RB #1 because interlaced RB #1 allocated to UE1 does not overlap with resources indicated by the UL CI. Upon receiving the UL CI, UE2 may cancel transmission of the scheduled LP PUSCH because interlaced RB #4 allocated to UE2 overlaps with the resources indicated by the UL CI. In this case, a UE scheduled with transmission of the HP PUSCH may transmit the HP PUSCH in interlaced RB #4 in RB set #1 without performing the CAP based on LBT because the X-bit part of the UL CI is not all zero.

Referring to FIG. 13, when the BS schedules an LP PUSCH for UE1 in interlaced RB #1 in RB set #1 and schedules an LP PUSCH for UE2 on some time resources in interlaced RB #4 in RB set #1, if the BS schedules an HP PUSCH in interlaced RB #4 in RB set #1 with a gap with the LP PUSCH for UE2 as illustrated in FIG. 13, it is necessary to perform LBT before transmission of the HP PUSCH because it is difficult to guarantee that interlaced RB #4 is continuously occupied before the transmission of the HP PUSCH. Accordingly, the BS may transmit to UE(s), for example, a UL CI of which an X-bit part and a Y-bit part are {00000} and {01000}, respectively according to some implementations of the present disclosure. In some implementations, it may be defined that the X-bit part whose bits are all zero indicates all interlaced RBs in a corresponding RB set. Referring to FIG. 13, upon receiving the UL CI having the X-bit part whose bits are all zero, UE1 may determine that interlaced RB #1 assigned to UE1 is canceled by the UL CI and then cancel transmission of the scheduled LP PUSCH. Upon receiving the UL CI, UE2 may determine that interlaced RB #4 assigned to UE2 overlaps with resources indicated by the UL CI and then transmit the scheduled LP PUSCH. In this case, a UE scheduled with transmission of the HP PUSCH may perform the CAP based on LBT. When successfully completing the CAP, the UE may transmit the HP PUSCH in interlaced RB #4 in RB set #1 because the X-bit part of the UL CI is all zero.

According to Implementation A3-4, the UE may be given with an explicit LBT instruction for UL transmission that may be performed after transmission cancellation by a UL CI, thereby reducing ambiguity in the UE operation caused by UL transmission cancellation.

According to some implementations of the present disclosure, a UL CI may be included in a field corresponding to a serving cell to which interlaced RB-based resource allocation is applied or a field corresponding to a serving cell on a shared spectrum among fields in DCI format 2_4 for serving cells configured for the UL CI. A separate DCI format may be defined for a UL CI for serving cell(s) to which interlaced RB-based resource allocation is applied or serving cell(s) on a shared spectrum.

BS Side:

The above-described implementations of the present disclosure will be explained again from the perspective of the BS.

Figure 14:
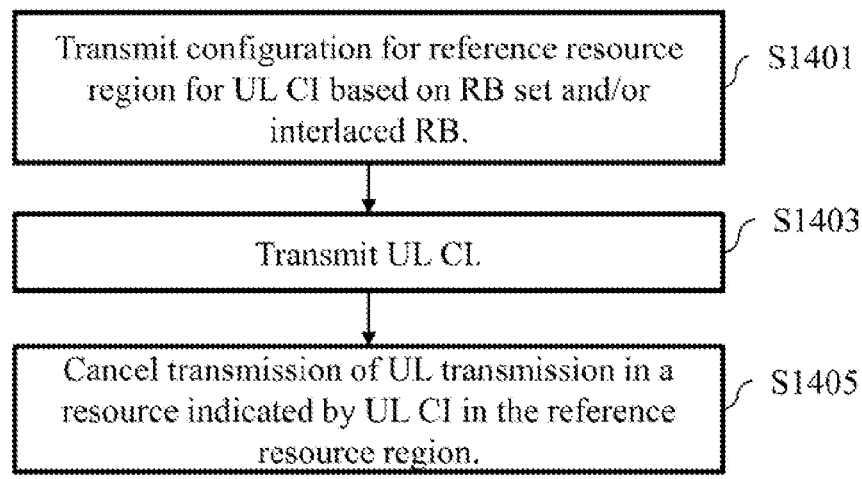
FIG. 14 illustrates an example of based station (BS) operation flows according to some implementations of the present disclosure.

FIG. 14 illustrates an example of BS operation flows according to some implementations of the present disclosure.

Before transmitting a UL CI, the BS may transmit RRC parameters for configuring a reference resource region to which the UL CI is applicable in units of RB sets and/or PRB interlaces (S1401). When the BS transmits the UL CI (S1403), the BS may determine canceled resources (e.g., interlaced RB) in the reference resource region and cancel reception of previously scheduled UL transmission on the canceled resources according to some implementations of the present disclosure (S1405). For example, the BS may not attempt to receive the canceled UL transmission on the resources cancelled by the UL CI.

The following BS operations may be considered in implementations of the present disclosure.

<Implementation B1> RB Set Based Reference Resource Region for UL CI

The BS may configure RB set(s) that may be indicated by a UL CI to the UE through higher layer signaling. For example, when the UE operates in an unlicensed band, the UE performs UL transmission based on a CAP in units of RB sets. Thus, the UL transmission may also be performed in units of RB sets. Considering this point, if resources indicated by a UL CI are represented in units of RB sets to effectively indicate transmission using only some RB sets through the UL CI, the UE transmission in the unlicensed band may be effectively indicated with small signaling overhead.

In some implementations, the BS may preconfigure for UE(s) RB set(s) that may be indicated by a UL CI. If the reference resource region for the UL CI is limited to some RB set(s) as described above, the burden of PDCCH monitoring in the UE may be reduced, and the signaling overhead of the UL CI may be reduced. In this case, the RB sets set as the reference resource region to which the UL CI is applicable may be some or all of the entire RB sets defined in a UL cell, and the entirety or part of the reference resource region may be indicated in UL CI DCI. For example, some of the RB sets considering the intra-cell guard band described in Section 7 of 3GPP TS 38.214 V16.3.0 may be indicated as the RB set(s) for the reference resource region for the UL CI. When the maximum number of configurable RB sets is X (e.g., 5), RB set(s) that may be indicated by the UL CI through an RRC parameter having a size of X bits for the UL CI, that is, the reference resource region may be determined.

<Implementation B2> Interlaced RB Based Reference Resource Region for UL CI

The BS may configure a set of interlaced RBs, which may be indicated by a UL CI, to the UE through higher layer signaling (e.g., RRC signaling).

For example, when the UE operates in an unlicensed band, the BS may determine RB sets and interlaced RBs in the RB sets for the UE to schedule UL resources to the UE. Considering this point, to effectively cancel transmission using some interlaced RBs without unnecessary cancellation of UE transmission using other interlaced RBs through a UL CI, it may be considered to represent resources indicated by the UL CI based on an interlaced RB structure. To this end, a set of interlaced RBs (i.e., reference interlaced RB(s)) that may be indicated by the UL CI may be configured to the UE. If the reference resource region for the UL CI is limited to some interlaced RB(s) as described above, the burden of PDCCH monitoring in the UE may be reduced, and the signaling overhead of the UL CI may be reduced.

In this case, a predetermined number of interlaced RB(s) may be used per RB set. For example, a certain number of interlaced RBs may be set as the reference resource region for the UL CI for each RB set. To determine the number of interlaced RBs per RB set, a specific SCS (i.e., reference SCS) may be assumed, and the number of interlaced RBs per RB set may be determined based on this assumption. For example, assuming an SCS of 15 kHz, 10 interlaced RBs may be used per RB set. As another example, assuming an SCS of 30 kHz, 5 interlaced RBs may be used per RB set.

When interlaced RBs are determined on the assumption of an SCS of X kHz and the interlaced RBs are applied to a UL BWP with an SCS of Y kHz (where X<Y), a set of interlaced RBs, interlaced RB set A including Y/X contiguous interlaced RBs, which may be indicated by a UL CI, may be interpreted as one interlaced RB, interlaced RB B in the corresponding UL BWP. In other words, the UE may interpret indicating PRBs with interlace indices of {0/1, 2/3, 4/5, 6/7, 8/9} for the 15 kHz SCS as equivalent to indicating PRBs with interlace indices of {0, 1, 2, 3, 4} for the 30 kHz SCS. In this case, if at least one interlaced PRB among the interlaced PRBs included in interlaced RB set A is indicated, the UE may assume that the entirety of interlaced RB B is indicated. For example, even when only interlace index 1 is indicated for the 15 kHz SCS, the UE may assume that interlace index 0 is indicated for the 30 kHz SCS. Specifically, when an interlaced RB with index a, which is determined on the assumption of an SCS of X kHz, is applied to a UL BWP with an SCS of Y kHz, the UE may interpret that index a indicates one interlaced RB, interlaced RB B with index b=floor(a/(Y/X)).

When interlaced RBs are determined on the assumption of an SCS of Y kHz and the interlaced RBs are applied to a UL BWP with an SCS of X kHz (where X<Y), one interlaced RB, interlaced RB A', which may be indicated by a UL CI, may be interpreted as a set of interlaced RBs, interlaced RB set B' including Y/X contiguous interlaced RBs in the corresponding UL BWP. In other words, the UE may interpret indicating PRBs with interlace indices of {0, 1, 2, 3, 4} for the 30 kHz SCS as equivalent to indicating PRBs with interlace indices of {0/1, 2/3, 4/5, 6/7, 8/9} for the 15 kHz SCS. For example, when the index of interlaced RB A' is a', interlaced RB set B' may include Y/X contiguous interlaced RBs from an interlaced RB having index of a'*(Y/X).

In this case, interlaced RBs, which are set as the reference resource region, may be configured separately for each RB set defined on a UL carrier. For example, interlaced RBs for the reference resource region may be configured for each RB set. In this case, the number of interlaced RBs configured for the UL CI reference resource region may vary per RB set. Alternatively, the reference SCS, which is configured to determine the number of interlaced RBs per RB set, may vary.

For example, if an SCS of 15 kHz (ie u=0) is assumed or 10 interlaced RBs are assumed per RB set, indicatable reference interlaced RB(s) may be determined by a 6-bit RRC parameter for representing contiguous interlaced RBs, or the reference interlaced RB(s) may be determined by a 10-bit bitmap for representing non-contiguous interlaced RBs. In some implementations, the method of determining X MSBs of RB resource allocation for u=0 in UL resource allocation type 2 described above may be used to represent the contiguous interlaced RBs.

As another example, if an SCS of 30 kHz (i.e. u=1) is assumed or 5 interlaced RBs are assumed per RB set, indicatable reference interlaced RB(s) may be determined by a 5-bit bitmap for representing non-contiguous interlaced RBs.

<Implementation B3> Frequency Domain Resource Indication for UL CI with Interlaced RB When the BS transmits a UL CI to UE(s) and determines the position of UL time/frequency resources indicated by the UL CI based on the reference resource configuration according to Implementation B1 and/or Implementation B2, the BS and UE(s) may determine UL frequency resources indicated by the UL CI based on the following information: information X and Y included in the UL CI.

<Implementation B3-1> Information X Indicating Interlaced RB in UL CI

In some implementations, a UL CI may include first information, information X indicating interlaced RBs. The first information, information X may be a bitmap consisting of a minimum of one bit and a maximum of 5 or 10 bits, and the information length and maximum information length may be determined by a reference SCS. Among SCSs used for a UL carrier configured to the UE, the smallest SCS may be used as the reference SCS, or the SCS of a DL BWP in which a PDCCH carrying the UL CI is transmitted may be used as the reference SCS. Alternatively, the smaller one of the two SCSs may be used as the reference SCS. For example, the reference SCS may be a smaller SCS configuration among i) the SCS configuration of the PDCCH and ii) the smallest SCS $u_{UL}$ provided by scs-SpecificCarrierList of FrequencyInfoUL-SIB or FrequencyInfoUL. Alternatively, the reference SCS may be included as an explicit RRC parameter in the UL CI configuration.

The maximum information length may be 10 bits when the reference SCS is 15 kHz or 5 bits when the reference SCS is 30 kHz.

The first information, information X may be configured with an MSB bitmap mapped to from the lowest interlace index to the MSB, and each bit may indicate an interlaced RB with a corresponding index.

For example, the UE and BS may assume that the reference SCS is 30 kHz. In this case, the UE and BS may assume that the information length of a UL CI is always 5 bits, which is the maximum length. This allows different UEs to have the same UL CI information length when a plurality of UEs receive the UL CI in group-common DCI on the same PDCCH. Considering that the BS needs to configure a different UE group for UE(s) having different UL CI information lengths, if UEs are capable of having the same UL CI information length, PDCCH overhead may be reduced due to the group-common DCI.

When interlaced RBs are indicated by a UL CI for which the reference SCS is X kHz and the interlaced RBs are applied to a UL BWP with an SCS of Y kHz (where X<Y), a set of interlaced RBs, interlaced RB set A including Y/X contiguous interlaced RBs, which may be indicated by the UL CI, may be interpreted as one interlaced RB, interlaced RB B in the corresponding UL BWP. In other words, the UE may interpret indicating PRBs with interlace indices of {0/1, 2/3, 4/5, 6/7, 8/9} for the 15 kHz SCS as equivalent to indicating PRBs with interlace indices of {0, 1, 2, 3, 4} for the 30 kHz SCS. In this case, if at least one interlaced PRB among the interlaced PRBs included in interlaced RB set A is indicated by the UL CI, the UE may assume that the entirety of interlaced RB B is indicated by the UL CI. For example, even when only interlace index 1 is indicated for the 15 kHz SCS, the UE may assume that interlace index 0 is indicated for the 30 kHz SCS. Specifically, when an interlaced RB with index a, which is determined on the assumption of an SCS of X kHz, is applied to a UL BWP with an SCS of Y kHz, the UE may interpret that the interlaced RB with index a is one interlaced RB, interlaced RB B with index b=floor(a/(Y/X)).

When interlaced RBs are indicated by a UL CI for which the reference SCS is Y kHz and the interlaced RBs are applied to a UL BWP with an SCS of X kHz (where X<Y), one interlaced RB, interlaced RB A', which may be indicated by the UL CI, may be interpreted as a set of interlaced RBs, interlaced RB set B' including Y/X contiguous interlaced RBs in the corresponding UL BWP. In other words, the UE may interpret indicating PRBs with interlace indices of {0, 1, 2, 3, 4} for the 30 kHz SCS as equivalent to indicating PRBs with interlace indices of {0/1, 2/3, 4/5, 6/7, 8/9} for the 15 kHz SCS. For example, when the index of interlaced RB A' is a', interlaced RB set B' may include Y/X contiguous interlaced RBs from an interlaced RB having index of a'*(Y/X).

<Implementation B3-2> Information Y Indicating RB Set in UL CI

In some implementations, a UL CI may include second information, information Y indicating RB sets. The second information, information Y may be a bitmap consisting of $N_{refRB-set}$ bits, where $N_{refRB-set}$ may be the number of RB sets included in a reference frequency region. Alternatively, $N_{refRB-set}$ may be the total number of RB sets configured according to Implementation A1.

The second information, information Y may be configured with an MSB bitmap mapped to from the lowest RB set index to the MSB, and each bit may indicate an RB set with a corresponding index.

In some implementations, information Y may not be included in the UL CI, or the information length thereof may be assumed to be zero bits based on higher layer signaling from the BS. In other words, whether information Y is included in the UL CI may be determined based on the higher layer signaling from the BS. If information Y is not included, the UE and BS may always assume that all RB set(s) of the (configured) reference frequency region are indicated.

<Implementation B3-3> Information X and Y Indicating Interlaced RB in Interlaced RB Set in UL CI When information X and Y are capable of being included in a UL CI, the following may be considered.

Alt 1: If information Y is not included or has a length of zero bits, the UE may determine indicated interlaced RB sets by applying information X to all RB set(s) of a reference frequency region. For example, when RB set #1 and RB set #2 are set to the reference frequency region, and information X in a UL CI transmitted to the UE indicates interlaced RB #0, the BS may assume that the UE will cancel scheduled UL transmission that overlaps with interlaced RB #0 of RB set #1 and interlaced RB #0 of RB set #2.

Alt 2: If information X is not included or has a length of zero bits, a UL CI may include $N_{refRB-set}$ fields for information Y. Each field for information Y may sequentially indicate all interlaced RBs included in each RB set from the lowest RB set index.

Alt 3: When the length of information Y is greater than zero bits and the bit value(s) of information Y are all zero, the UE may ignore the corresponding UL CI.

Alt 4: When both information X and information Y are included in a UL CI, if the length of information Y is greater than zero bits, the length of information X is greater than zero bits, and the bit values of information X are all zero, the BS may assume that the UE will consider that all PRBs in one or more RB sets indicated by the UL CI are indicated by the UL CI.

<Implementation B3-4> Priority Handling with Information X and Y for UL CI

In some implementations, when a UL CI is capable of indicating certain UL resources in more than one method, the BS may assume that the UE will perform different UE operations for UL transmission that is not canceled by the UL CI for each method. The UL CI may include information on whether UL transmission of a high priority is to be canceled.

For example, when the UL CI indicates frequency-domain resources in the first information, information X and/or the second information, information Y, if the values of information X are all zero, the UE may assume that all interlaced RBs including UL resource A in an indicated RB set are indicated by the UL CI. Alternatively, if the bit value of information X corresponding to a certain interlaced RB is indicated as 1, UL resource A may be explicitly indicated by the UL CI. In both cases, the BS may assume that the UE will cancel UL transmission using UL resource A. However, for UL transmission B using UL resource A but not canceled by the UL CI, for example, UL transmission with a higher priority than that of UL transmission canceled by the UL CI, or for UL transmission scheduled by DCI received after reception of the UL CI, the BS may assume that the UE will perform different UE operations depending on how the UL CI indicates UL resource A.

In some implementations, if UL resource A is included in the UL CI and indicated by information X whose bit values are all zero, the BS may assume that the UE will perform UL transmission B after performing the CAP based on LBT. If UL resource A is included in the UL CI and indicated by information X whose bit values are not all zero, the BS may assume that the UE will perform UL transmission B without performing the CAP based on LBT.

According to Implementation B3-4, the UE may be given with an explicit LBT instruction for UL transmission that may be performed after transmission cancellation by a UL CI, thereby reducing ambiguity in the UE operation caused by UL transmission cancellation.

According to some implementations of the present disclosure, the UE and BS may perform an RRC configuration for determining a UL CI reference resource region consisting of RB set(s) and/or PRB interlaces for UL transmission performed by the UE on non-contiguous frequency resources. When the BS provides the UL CI to the UE, the UE may receive resources in the UL CI reference resource region through the UL CI. Then, the UE may determine whether to cancel UL transmission scheduled to be performed in a subband (e.g., RB set) or a specific PRB interlace according to some implementations of the present disclosure.

According to some implementations of the present disclosure, the BS may configure UL reference resources for a UL CI to the UE, and the UE may receive the UL CI based on a corresponding configuration and then determine to cancel UL transmission in some RB sets or some interlaced RBs. According to some implementations of the present disclosure, the BS may cancel UE transmission using each RB set of a band (e.g., an unlicensed band) to which non-contiguous resource allocation is applied while minimizing the impact on other transmissions. According to some implementations of the present disclosure, an RB set or an interlaced RB may be used as the unit of a UL CI, instead of using a UL CI based on a bitmap for mapping each bit in units of consecutive RBs, thereby reducing the signaling overhead of the UL CI.

Figure 15:
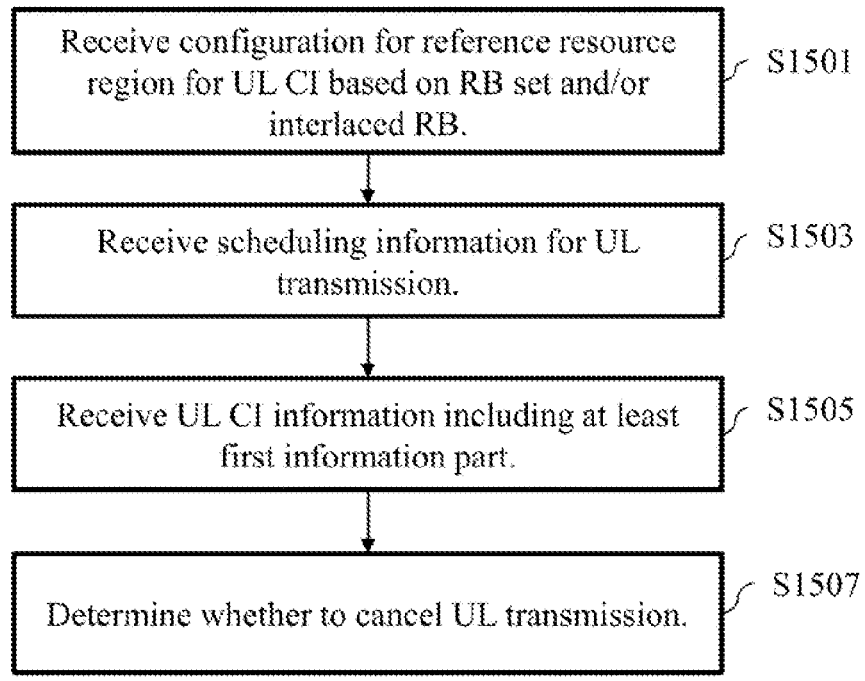
FIG. 15 illustrates another example of UE operation flows according to some implementations of the present disclosure.

FIG. 15 illustrates another example of UE operation flows according to some implementations of the present disclosure.

For performing an UL transmission, a UE may perform operations according to some implementations of the present disclosure. The UE may include: at least one transceiver; at least one processor; and at least one computer memory operably connected to the at least one processor and configured to store instructions that, when executed, cause the at least one processor to perform the operations according to some implementations of the present disclosure. A processing device for a UE may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the UE, processing device, computer-readable (non-volatile) storage medium, and/or computer program product, the operations may include: receiving a configuration for a reference resource region for a UL CI (S1501); receiving scheduling information for scheduling the UL transmission on a frequency band including the reference resource region (S1503); receiving UL CI information related to the reference resource region (S1505); and based on whether a first resource for the UL transmission overlaps with a second resource indicated by the UL CI information among resources in the reference resource region, determining whether to cancel the UL transmission (S1505). The reference resource region may include one or more RB sets, each of which includes a plurality of interlaced RBs. The UL CI information may include a first information part on at least one of the plurality of interlaced RBs in each of the one or more RB sets.

In some implementations, the operations may include, based on the first resource for the UL transmission not overlapping with the second resource indicated by the UL CI information, performing the UL transmission.

In some implementations, the operations may include, based on the first resource for the UL transmission overlapping with the second resource indicated by the UL CI information, performing the UL transmission.

In some implementations, the UL CI information may include a second information part indicating one of the one or more RB sets.

In some implementations, the frequency band may be an unlicensed band.

In some implementations, the operations may include, based on i) the first resource for the UL transmission overlapping with the second resource indicated by the UL CI information and ii) the UL transmission having a low priority, performing the UL transmission.

In some implementations, the operations may include, based on i) the first resource for the UL transmission overlapping with the second resource indicated by the UL CI information and ii) the UL transmission having a high priority, performing the UL transmission.

In some implementations, the operations may include, based on at least one bit of the first information part not being zero, performing the UL transmission without an LBT process.

In some implementations, the operations may include: based on all bits of the first information part being zero, performing an LBT process; and based on success of the LBT process, performing the UL transmission.

Figure 16:
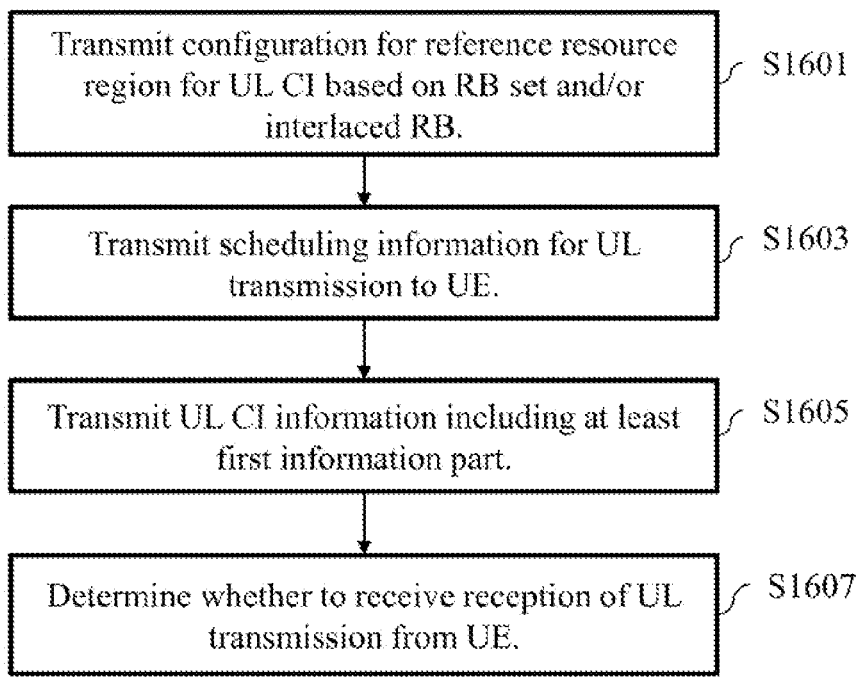
FIG. 16 illustrates another example of BS operation flows according to some implementations of the present disclosure.

FIG. 16 illustrates another example of BS operation flows according to some implementations of the present disclosure.

For performing an UL reception, a BS may perform operations according to some implementations of the present disclosure. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the BS, processing device, computer readable (non-volatile) storage medium, and/or computer program product, the operations may include: transmitting a configuration for a reference resource region for a UL CI (S1601); receiving to the UE scheduling information for scheduling the UL transmission on a frequency band including the reference resource region (S1603); transmitting UL CI information related to the reference resource region (S1605); and based on whether a first resource for the UL transmission overlaps with a second resource indicated by the UL CI information among resources in the reference resource region, determining whether to receive the UL transmission (S1607). The reference resource region may include one or more RB sets, each of which includes a plurality of interlaced RBs. The UL CI information may include a first information part on at least one of the plurality of interlaced RBs in each of the one or more RB sets.

In some implementations, the operations may include, based on the first resource for the UL transmission not overlapping with the second resource indicated by the UL CI information, skipping reception of the UL transmission.

In some implementations, the operations may include, based on the first resource for the UL transmission overlapping with the second resource indicated by the UL CI information, performing reception of the UL transmission.

In some implementations, the UL CI information may include a second information part indicating one of the one or more RB sets.

In some implementations, the frequency band may be an unlicensed band.

In some implementations, the operations may include, based on i) the first resource for the UL transmission overlapping with the second resource indicated by the UL CI information and ii) the UL transmission having a low priority, performing reception of the UL transmission.

In some implementations, the operations may include, based on i) the first resource for the UL transmission overlapping with the second resource indicated by the UL CI information and ii) the UL transmission having a high priority, performing reception of the UL transmission.

In some implementations, the operations may include setting at least one bit of the first information part to a non-zero value to indicate that the UL transmission needs to be performed without an LBT process.

In some implementations, the operations may include setting all bits of the first information part to zero to indicate that the UL transmission needs to be performed after an LBT process.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method of performing uplink transmission by a user equipment (UE) in a wireless communication system, the method comprising:
receiving a configuration for a reference resource region for an uplink cancellation indication;
receiving scheduling information for scheduling the uplink transmission on a frequency band including the reference resource region;
receiving uplink cancellation indication information related to the reference resource region; and
based on whether a first resource for the uplink transmission overlaps with a second resource indicated by the uplink cancellation indication information among resources in the reference resource region, determining whether to cancel the uplink transmission,
wherein the reference resource region includes one or more resource block (RB) sets, each of which includes a plurality of interlaced RBs, and
wherein the uplink cancellation indication information includes a first information part on at least one of the plurality of interlaced RBs in each of the one or more RB sets.

2. The method of claim 1, comprising, based on the first resource for the uplink transmission not overlapping with the second resource indicated by the uplink cancellation indication information, performing the uplink transmission.

3. The method of claim 1, comprising, based on the first resource for the uplink transmission overlapping with the second resource indicated by the uplink cancellation indication information, performing the uplink transmission.

4. The method of claim 1, wherein the uplink cancellation indication information includes a second information part indicating one of the one or more RB sets.

5. The method of claim 1, wherein the frequency band is an unlicensed band.

6. The method of claim 5, comprising, based on i) the first resource for the uplink transmission overlapping with the second resource indicated by the uplink cancellation indication information and ii) the uplink transmission having a low priority, performing the uplink transmission.

7. The method of claim 5, comprising, based on i) the first resource for the uplink transmission overlapping with the second resource indicated by the uplink cancellation indication information and ii) the uplink transmission having a high priority, performing the uplink transmission.

8. The method of claim 7, comprising, based on at least one bit of the first information part not being zero, performing the uplink transmission without a listen-before-talk (LBT) process.

9. The method of claim 5, comprising:
based on all bits of the first information part being zero, performing a listen-before-talk (LBT) process; and
based on success of the LBT process, performing the uplink transmission.

10. A user equipment (UE) configured to perform uplink transmission in a wireless communication system, the UE comprising:
at least one transceiver;
at least one processor; and
at least one computer memory operably connected to the at least one processor and configured to store instructions that, when executed, cause the at least one processor to perform operations comprising:
receiving a configuration for a reference resource region for an uplink cancellation indication;
receiving scheduling information for scheduling the uplink transmission on a frequency band including the reference resource region;
receiving uplink cancellation indication information related to the reference resource region; and
based on whether a first resource for the uplink transmission overlaps with a second resource indicated by the uplink cancellation indication information among resources in the reference resource region, determining whether to cancel the uplink transmission,
wherein the reference resource region includes one or more resource block (RB) sets, each of which includes a plurality of interlaced RBs, and
wherein the uplink cancellation indication information includes a first information part on at least one of the plurality of interlaced RBs in each of the one or more RB sets.

11. A method of receiving, by a base station (BS), uplink transmission from a user equipment (UE) in a wireless communication system, the method comprising:
transmitting a configuration for a reference resource region for an uplink cancellation indication;
transmitting to the UE scheduling information for scheduling the uplink transmission on a frequency band including the reference resource region;
transmitting uplink cancellation indication information related to the reference resource region; and
based on whether a first resource for the uplink transmission overlaps with a second resource indicated by the uplink cancellation indication information among resources in the reference resource region, determining whether to receive the uplink transmission,
wherein the reference resource region includes one or more resource block (RB) sets, each of which includes a plurality of interlaced RBs, and
wherein the uplink cancellation indication information includes a first information part on at least one of the plurality of interlaced RBs in each of the one or more RB sets.

12. A base station (BS) configured to receive uplink transmission from a user equipment (UE) in a wireless communication system, the BS comprising:
at least one transceiver;
at least one processor; and
at least one computer memory operably connected to the at least one processor and configured to store instructions that, when executed, cause the at least one processor to perform operations comprising:
transmitting a configuration for a reference resource region for an uplink cancellation indication;
transmitting to the UE scheduling information for scheduling the uplink transmission on a frequency band including the reference resource region;
transmitting uplink cancellation indication information related to the reference resource region; and
based on whether a first resource for the uplink transmission overlaps with a second resource indicated by the uplink cancellation indication information among resources in the reference resource region, determining whether to receive the uplink transmission,
wherein the reference resource region includes one or more resource block (RB) sets, each of which includes a plurality of interlaced RBs, and
wherein the uplink cancellation indication information includes a first information part on at least one of the plurality of interlaced RBs in each of the one or more RB sets.

* * * * *